US010447553B2

(12) United States Patent  
Biran et al.

(10) Patent No.: US 10,447,553 B2  
(45) Date of Patent: Oct. 15, 2019

(54) SYSTEMS AND METHODS FOR SERVICE-AWARE MAPPING OF A SYSTEM INFRASTRUCTURE

(71) Applicant: ServiceNow, Inc., Santa Clara, CA (US)

(72) Inventors: Noam Biran, Kfar Menahem (IL); Oded Tsur, Israel (IL)

(73) Assignee: ServiceNow, Inc., Santa Clara, CA (US)

( * ) Notice: Subject to any disclaimer, the term of this patent is extended or adjusted under 35 U.S.C. 154(b) by 134 days.

(21) Appl. No.: 15/587,881

(22) Filed: May 5, 2017

(65) Prior Publication Data

US 2018/0324054 A1 Nov. 8, 2018

(51) Int. Cl.
H04L 12/24 (2006.01)

(52) U.S. Cl.
CPC .......... *H04L 41/22* (2013.01); *H04L 41/0866* (2013.01); *H04L 41/5058* (2013.01)

(58) Field of Classification Search
CPC . H04L 41/0853; H04L 41/0856; H04L 41/12; H04L 41/08; H04L 41/085; H04L 41/0866; H04L 41/5096; H04L 67/34; H04L 67/10; H04L 67/2804; H04L 43/10; H04L 45/02; H04L 41/22; H04L 41/5058; H04L 41/14; H04L 41/145; H04L 43/045; H04L 43/02
See application file for complete search history.

(56) References Cited

U.S. PATENT DOCUMENTS

| | | | |
|---|---|---|---|
| 8,762,298 B1 * | 6/2014 | Ranjan | G06N 5/02 706/12 |
| 10,044,566 B1 * | 8/2018 | Grisco | H04L 67/16 |
| 10,148,549 B2 * | 12/2018 | Rimar | H04L 45/02 |
| 10,191,736 B2 * | 1/2019 | Ari | G06F 9/44505 |
| 2002/0143949 A1 * | 10/2002 | Rajarajan | G06F 9/5055 709/226 |
| 2014/0359129 A1 * | 12/2014 | Sharma | H04L 47/70 709/226 |
| 2015/0058471 A1 * | 2/2015 | McPherson | H04L 12/1432 709/224 |
| 2015/0213106 A1 * | 7/2015 | Kunde | G06F 16/282 718/1 |
| 2015/0280999 A1 * | 10/2015 | Chart | H04L 41/12 709/224 |
| 2016/0072676 A1 * | 3/2016 | Gomadam | H04L 41/12 709/221 |
| 2016/0205037 A1 * | 7/2016 | Gupte | H04L 67/10 709/226 |
| 2017/0155556 A1 * | 6/2017 | Yuan | H04L 41/142 |
| 2017/0163644 A1 * | 6/2017 | Horii | H04L 63/10 |
| 2018/0123940 A1 * | 5/2018 | Rimar | H04L 45/02 |
| 2018/0287903 A1 * | 10/2018 | Joshi | H04L 67/10 |

(Continued)

*Primary Examiner* — Alina A Boutah

(74) *Attorney, Agent, or Firm* — Fletcher Yoder PC

(57) ABSTRACT

Systems, methods, and media for finding configuration files are presented. Traffic-based connections may provide search parameter insight for searching a component for configuration data. The search parameters derived from the traffic-based connections may be used to facilitate discovery of configuration files in non-conventional locations. Further, Platform as a Service (PaaS) components may be discovered using specialized pattern operations.

20 Claims, 19 Drawing Sheets

(56) References Cited

U.S. PATENT DOCUMENTS

2018/0288129 A1* 10/2018 Joshi ................. H04L 43/08
2018/0309637 A1* 10/2018 Gill .................. H04L 67/36
2019/0104023 A1*  4/2019 Rimar ................ H04L 41/12

* cited by examiner

/opt/OV/nonOV/tomcat/b/conf/server.xml | Next Difference | Previous Difference |

| | 2016-11-24 09:33:37 | | 2016-11-24 09:34:14 |
|---|---|---|---|
| 1 | <!-- Example Server Configuration File --> | 1 | <!-- Example Server Configuration File --> |
| 2 | | | |
| 3 | <!-- Note that component elements are nested corresponding to their parent-child relationships with each other --> | | |
| 4 | <!-- A "Server" is a singleton element that represents the entire JVM, | 2 | <!-- A "Server" is a singleton element that represents the entire JVM, |
| 5 | which may contain one or more "Service" instances. The Server | 3 | which may contain one or more "Service" instances. The Server |
| 6 | listens for a shutdown command on the indicated port. | 4 | listens for a shutdown command on the indicated port. |
| 7 | | 5 | |
| 8 | Note:A "Server" is not itself a "Container", so you may not | 6 | Note:A "Server" is not itself a "Container", so you may not |
| 9 | define subcomponents such as "Valves" or "Loggers" at this level. | 7 | define subcomponents such as "Valves" or "Loggers" at this level. |
| 10 | --> | 8 | --> |
| 11 | | 9 | |
| 12 | <Server port = "8006" shutdown= "SHUTDOWN"> | 10 | |
| 13 | | 11 | <Server port = "8006" shutdown= "SHUTDOWN"> |
| 14 | <!-- Comment these entries out to disable JMX MBeans support used for the | 12 | |
| 15 | administration web application --> | 13 | <!-- Comment these abc entries out to disable JMX MBeans support used for the |
| 16 | <Listener className= "org.apache.catalina.core.AprLifecycleListener" "SSLEngine= "on" /> | 14 | administration web application --> |
| 17 | <!-- Initialize Jasper prior to webapps are loaded. Documentation at /docs/jasper-howto.html --> | 15 | <Listener className= "org.apache.catalina.core.AprLifecycleListener" "SSLEngine= "on" /> |
| 18 | <Listener className= "org.apache.catalina.core.JasperListener" /> | 16 | <!-- Initialize Jasper prior to webapps are loaded. Documentation at /docs/jasper-howto.html --> |
| 19 | <Listener className= "org.apache.catalina.mbeans.ServerLifecycleListener" /> | 17 | <Listener className= "org.apache.catalina.core.JasperListener" /> |
| 20 | <Listener className= "org.apache.catalina.mbeans.GlobalResourcesLifecycleListener" /> | 18 | <Listener className= "org.apache.catalina.mbeans.ServerLifecycleListener" /> |
| 21 | | 19 | <Listener className= "org.apache.catalina.mbeans.GlobalResourcesLifecycleListener" /> |
| | | 20 | |
| 22 | <!-- Global JNDI resources --> | 21 | <!-- Another comment --> |
| | | 22 | |
| 23 | | 23 | <!-- Global JNDI resources --> |

FIG. 8

SYSTEMS AND METHODS FOR SERVICE-AWARE MAPPING OF A SYSTEM INFRASTRUCTURE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times.

As systems for collecting data become more readily available and the costs for storage hardware continue to decrease, the amount of data that these computer resources are capable of collecting is increasing. For instance, in addition to collecting raw data more frequently, metadata associated with the time in which the raw data has been generated or acquired may also be stored for a given data set.

Further, as computer resources increase, inter-dependencies between computer resources and/or services may increase. In other words, services may be affected by component-specific changes, failures and/or performance issues. Thus, a service-aware view of a system infrastructure may be created, in an attempt to understand these inter-dependencies. Unfortunately, however, manual approaches are often not sufficient, as infrastructure changes may occur rapidly, resulting in out-of-date mappings.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. Graphical-user-interfaces may provide interactive objects, which enable usage of this data. As GUIs become increasingly complex, it may be more difficult to discern certain characteristics of the GUIs' interactive objects.

With this in mind, an IT system may include service mapping logic that generates an accurate, service-aware view (e.g., a "service mapping") of the system infrastructure that is frequently refreshed, keeping the view up to date. The service mapping may be constructed by discovering and mapping relationships between IT components running specific services. The service mapping logic may monitor the IT infrastructure for service-affecting changes and update the service mapping in real-time. The service mapping may provide a mix of applications and IT components that support a service and provide an understanding of how these applications and components are related.

The service mapping logic provided herein may enable discovery of logical services without hardware, such as Platform as a Service (PaaS) services. Such PaaS services may include Amazon Web Services (AWS) elastic load balancing (ELB) and relational database services (RDS) and/or Azure Load Balancer (LB), Websites, and Structured Query Language (SQL), etc. These host-less components may be discovered both by infrastructure and application patterns as part of cloud only or hybrid services. Further, the current service mapping logic may provide guidance for creating new discovery patterns based upon an existing traffic-based connection.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 8 illustrates a comparison screen comparing a first version of a configuration file to a second version of the configuration file, in accordance with an embodiment;

DETAILED DESCRIPTION

Figure 1:
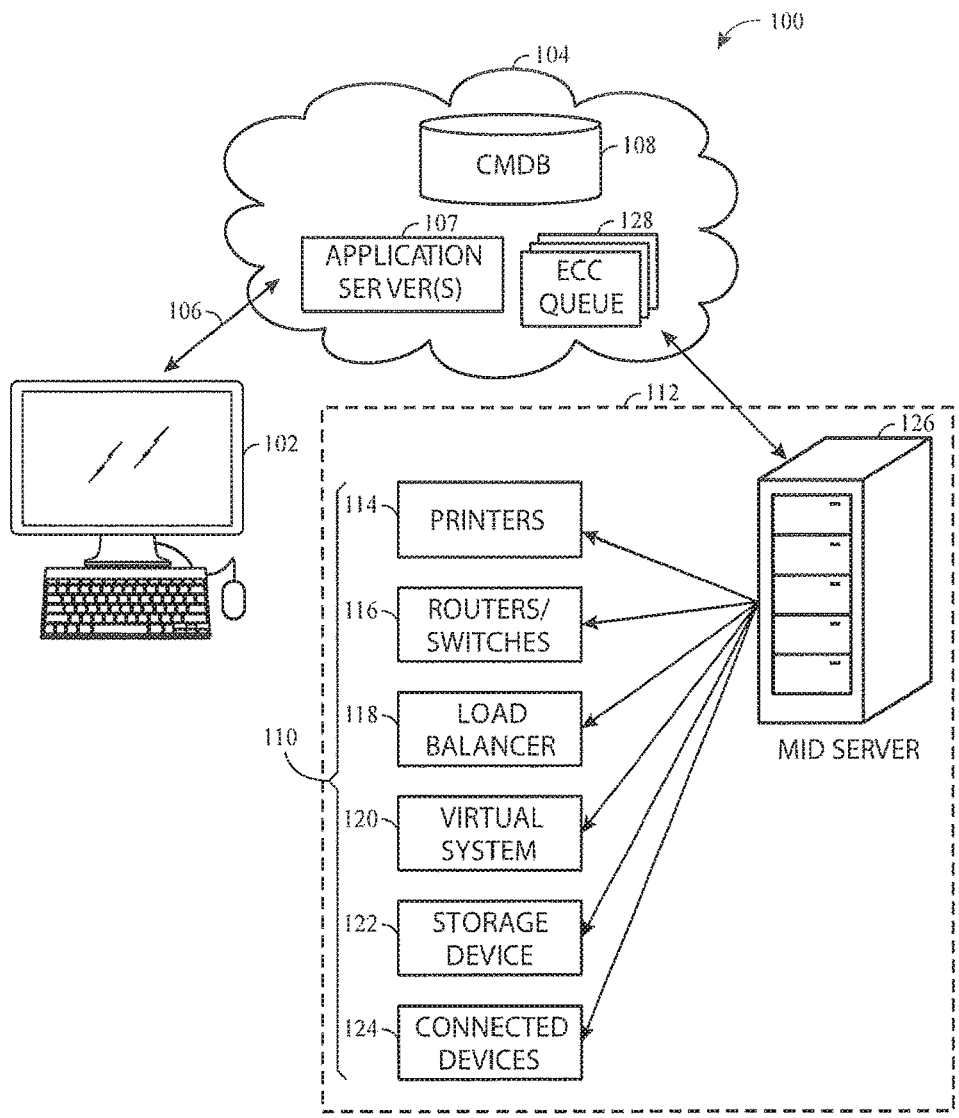
FIG. 1 is a block diagram of a distributed computing system utilizing a cloud service and a configuration management databases (CMDB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronic devices are interconnected within a distributed context. As more and more functions are performed by services using some form of distributed computing, the complexity of IT network management increases. As these devices are separated geospatially, managing and tracking configuration of these devices may become more difficult.

In such an interconnected but distributed context, the configuration of each of these devices may be represented by configuration items (CIs) that detail certain configurations, parameters, components, software, or settings associated with a respective device. As will be discussed in greater detail below, CIs may include information related to a physical entity (e.g., hardware), a logical entity (e.g., version, instance of a database), a conceptual entity (e.g., service), and the like associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program, running on the network in question. When a CI is found by such routines, discovery includes exploring some or all of the CI's configuration, provisioning, and current status. This explored information is used to update one or more databases, such as a configuration management database (CMDB), accordingly.

The CMDB stores and tracks all of the discovered devices connected to the network. On computer systems, the discovery process may also identify software applications running on the discovered devices, and any connections, such as Transmission Control Protocol (TCP) connections between computer systems. Discovery may also be used to track all the relationships between computer systems, such as an application program running on one server that utilizes a database stored on another server. CI discovery may be performed at initial installation or instantiation of connections or new devices, and/or CI discovery may be scheduled to occur periodically to track additions, removals, or changes to the IT devices being managed, thereby keeping data stored on the CMDB. Thus, using the discovery process, an up-to-date map of devices and their infrastructural relationships may be maintained.

Large information technology (IT) networks may include a large number of resources, such as servers, applications, and/or other hardware devices. Each of these devices may have one or more corresponding configuration files that control how the asset functions. These configuration files may facilitate discovery of the corresponding devices.

However, Platform as a Service (PaaS) services, such Amazon Web Services (AWS) elastic load balancing (ELB) and relational database services (RDS), Azure Load Balancer (LB), Websites, and Structured Query Language (SQL), etc. may be host-less components, where discovery may be more challenging. These PaaS services may be discovered both by infrastructure and application patterns as part of cloud only or hybrid services. The current service mapping logic may provide guidance for creating new discovery patterns based upon an existing traffic-based connection.

By way of introduction, FIG. 1 is a block diagram of a system 100 that utilizes distributed computing framework, which may perform one or more of the techniques described herein. As illustrated in FIG. 1, a client 102 communicates with a platform 104, e.g., a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together and communicate using one or more networks. For instance, the platform 104 may be a cloud service platform that includes various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionalities, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the platform 104 may include one or more other database servers. The database servers are configured to store, manage, or otherwise provide data for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely, such as at a client site.

In the depicted topology, access to the platform 104 is enabled via a management, instrumentation, and discovery (MID) server 126 via a communication queue 128, such as an External Communications Channel (ECC) Queue. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

As discussed below, the MID server 126 may periodically and/or intermittently use discovery probes to determine information on devices connected to the network 112 and return the probe results back to the platform 104. Probes may have different types and functions. For example, some probes get the names of devices of specific operating systems (e.g., Windows or Linux) while other exploration probes return disk information for those devices using the operating systems. Some probes run a post-processing script to filter the data that is sent back to the platform 104.

As a non-limiting example, the probe types available for use by the MID server 126 may include a Common Information Model (CIM) probe that utilizes the CIM query language to query a CIM server using Web-Based Enterprise Management (WBEM) protocols, a Simple Network Manage Protocol (SNMP) probe to discover information about network device (e.g., routers), a Windows Management Instrumentation (WMI) Runner probe that uses the WMI to obtain information about a Windows-based device, a Powershell probe that executes Powershell scripts (e.g., Powershell V2 scripts) on a host for the MID server 126, a Secure Copy (SCP) Relay Probe that copies a file or directory contents from one host to another via the MID server 126, a Secure Shell (SSH)-based probe that executes a shell command on a target host and returns the output, a Shazzam probe that determines what devices are active using a targeted port scan, a user-defined probe class, a multi-probe that combines probe types, and/or any combination thereof.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication queue 128 may be a database table that is typically queried, updated, and inserted into by other systems. Each record in the communication queue 128 is a message from an instance in the platform 104 to a system (e.g., MID server 126) external to the platform 104 that connects to the platform 104 or a specific instance running in the platform 104 or a message to the instance from the external system. The fields of a communication queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message. The agent field identifies a name (e.g., mid.server.xxxx) of the external system that the message is directed to or originates from. The topic field is a value (e.g., arbitrary values) that indicates that a message pertains to a particular subject. For example, during discovery of CIs 110, the topic field may be populated with a value to identify a name of the probe that has been/is going to be run. The name field provides more detail in a context indicated by the topic field. For example, in discovery, the name field may be a descriptive and human-readable name or a command to be run by the probe identified in the topic field. Alternatively, if the topic field contains "SSHCommand", the name field may indicate the shell command to be run.

The source field indicates a target or recipient of the message outside of the platform 104. In discovery, the source field may contain an Internet Protocol (IP) address that the discovery probe is to be/has been run against, or the field may include a human-readable description when the probe is to be/has been run against multiple IP addresses.

The response to field, when included, contains a reference (e.g., sys_id) to the communication queue 128 that the message is a response to. In discovery, a discovery result may be a response to a discovery schedule message.

The queue field indicates whether the message is incoming to the platform 104 or outgoing from the platform 104. The state field indicates whether the message is ready to be processed, is being processed, or has been processed. The recipient of the message generally updates this field. The time created field indicates when the record was first stored in the communication queue 128. The time processed field indicates when the record was updated to processed.

In some embodiments, the messages are sequenced using a sequencing field that includes a number assigned at generation of the record. The error string field, when included, indicates that an error occurred and/or a type of error that occurred.

The payload field is the body of the message. The contents of this field are specific to the context of the record and the system that is exchanging information with the platform 104. For example, a result of a discovery probe uses Extensible Markup Language (XML) documents for the payload. For instance, in some embodiments, the returned XML document may have a root tag of  containing one or more <result> tags and a single <parameters> tag. The parameters are simply an echo of those sent to the MID server 126 in the probe.

The platform 104 may allocate resources to users or groups of users in a multi-tenant and/or a single-tenant architecture. Allocating resources in a multi-tenant architecture includes include installations or instantiations of one or more servers, such as application servers, database servers, or any other server, or combination of servers, that can be shared amongst a group of users. For example, a web server, such as a unitary Apache installation; an application server, such as a unitary Java Virtual Machine; and a single database server catalog, such as a unitary MySQL catalog, may handle requests from multiple users. In a multi-tenant architecture, the application server, the database server, or both may distinguish between and segregate data or other information of the various customers using the system. In summary, multi-tenant architecture provides a single instance of software and all of the supporting infrastructure of the software serves multiple customers. In other words, each user shares the software application program and a database. The database and the software application program tracks who the data belongs to.

In a single-tenant architecture (which can also be referred to as a multi-instance architecture), separate web servers, application servers, database servers, or combinations thereof may be provisioned for at least some users or sub-users (e.g., sub-accounts) of those users. In the single-tenant architecture, one or more web servers are provided and dedicated to a user and/or sub-users of that user. Moreover, transactions are processed using one or more dedicated application servers, and data is stored in one or more database servers dedicated to the user or sub-users of that user. In summary, in a single-tenant architecture, a single instance serves only a single user (and its sub-users). Thus, each user has its own database and instance of the software application program. In other words, the database and the software application program are not shared between users (outside of a user's sub-users).

In use, a user's instance may include multiple web server instances, multiple application server instances, multiple database server instances, and/or any combination thereof. The server instances may be physically located on different physical servers and may share resources of the different physical servers with other server instances associated with other customer instances.

Although the system 100 is described as having the application servers 107, the CMDB 108, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
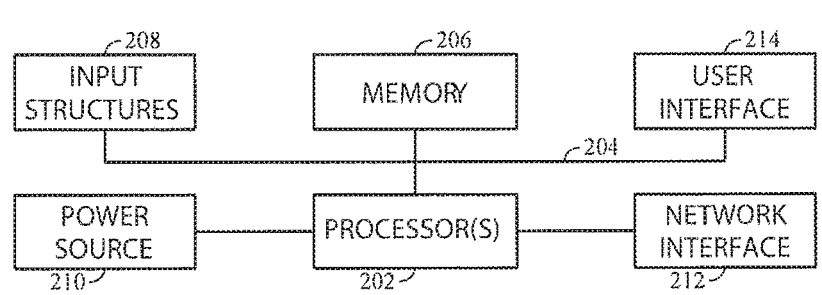
FIG. 2 is a block diagram of a generalized computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the ECC queue 128), device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other suitable circuitry performing functions by executing instructions stored in the memory 206 or in an otherwise accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
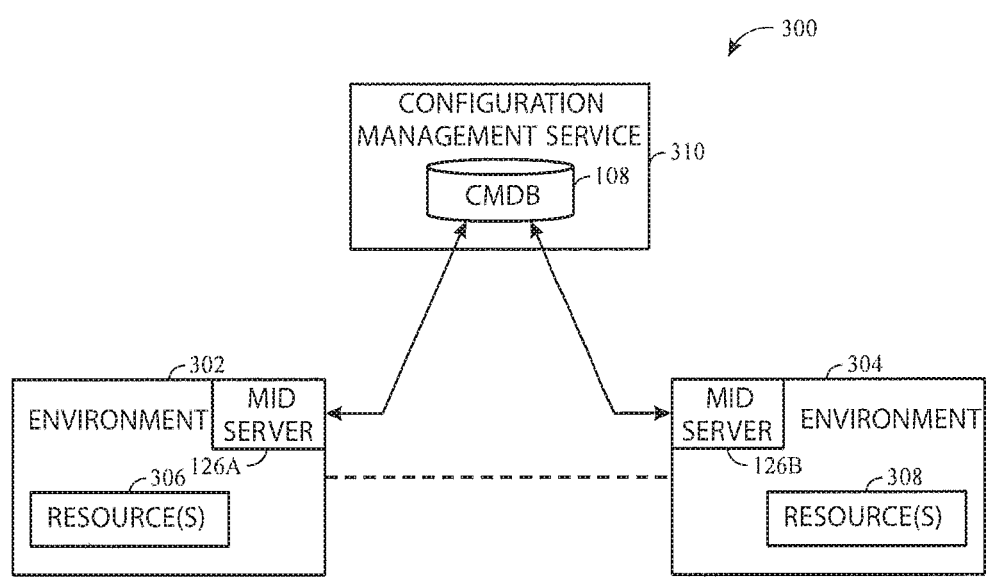
FIG. 3 is a block diagram of an electronic computing and communication system that utilizes the CMDB of FIG. 1, in accordance with an embodiment.

FIG. 3 is a block diagram of an embodiment of an electronic computing and communication system 300 for discovering and/or managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include a customer service environment used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 of the environments 302, 304 may communicate with each other across environments. However, in some embodiments, aspects of various environments may be provided by different vendors without communication there between. In such embodiments, the resources of disparate environments may communicate using the platform 104 (e.g., a configuration management service 310 that is a part of a cloud service platform 104 including the CMDB 108). The resources 306 and 308 may include any suitable configuration item 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments may not directly communicate with each other). Using this catalogue, the configuration management service 310 may discover new resources, provision resources, allocate resources, modify, and/or remove resources from the catalogue across a single environment or multiple environments. In some embodiments, these actions may be initiated using the client 102, scheduled for periodic occasions (e.g., periodic discovery), or a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discovery process which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server may be employed when the MID server may reach into multiple environments. For example, if the MID server is run in the platform 104 (e.g., in the configuration management service 310), a single MID server may be used to manage both environments 302 and 304. Additionally or alternatively, if the MID server 126A has access to the environment 304, the MID server 126B may be omitted.

As previously discussed, each discovered resource is identified as a configuration item 110 with a record stored in the CMDB 108 including data indicating properties, attributes, dependencies, or other information about the resource. The CMDB 108 may be encoded, for example, as a relational database management system (RDBMS); an object-oriented database (e.g. an XML database); a network model database; or a flat-file database.

Figure 4:
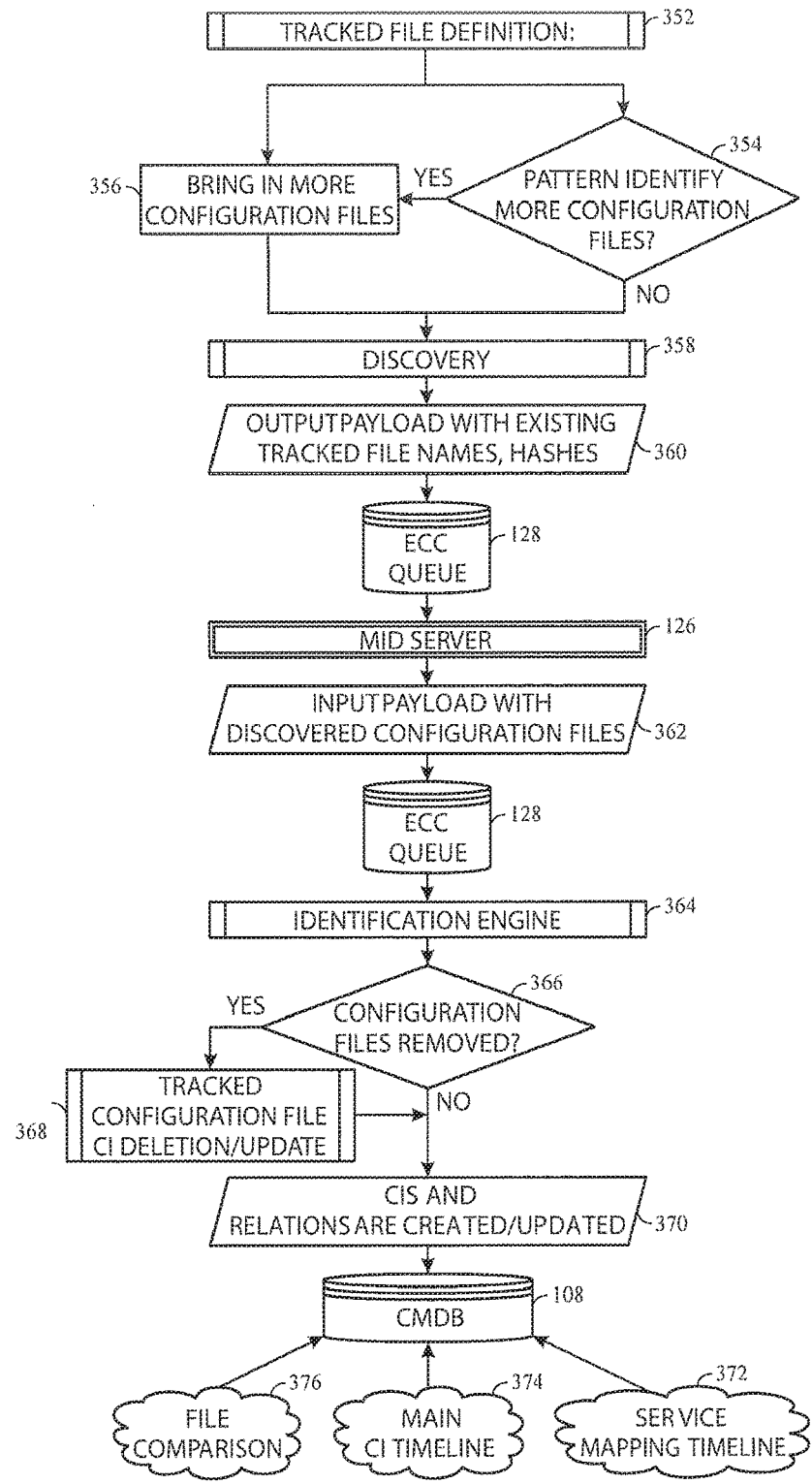
FIG. 4 is a block diagram illustrating a process for tracking configuration files utilizing a discovery server, in accordance with an embodiment.

Over time, configuration files used by the CIs 110 may change. As previously noted, in systems with multiple CIs 110 it may be difficult and/or time-consuming to examine the configuration files to determine where or when changes are made to various files. FIG. 4 illustrates a flow diagram of CI 110 discovery. A tracked file definition 352 is submitted via the client 102 or another location. The tracked file definition 352 defines how to find the configuration file(s) to be tracked and/or other information about the file. The tracked file information may include, but is not limited to, the information below in Table 1.

TABLE 1

Tracked file information

| Field name | Label | Type | Description |
|---|---|---|---|
| file_path | File Path | String | Configuration files path expression |
| pattern | Discovery Pattern | Reference | Additional attributes - OS, run order, etc. |
| ci_type | CI Type | Table name | Type of device for the associated CI |
| save_content | Save Content | Boolean | Provides the option to decide whether to save the content of the files under the indicated path |
| active | Active | Boolean | Indicates whether the tracking is active. |

Although each tracked file information entry may include a flag of whether the content is tracked (e.g., active field), in some embodiments, a user may globally enable and/or disable tracking for configuration files. For example, when the user wants to limit memory consumption, the user may disable configuration file tracking. For instance, the tracked file definition 352 includes a file path that indicates where one or more configuration files may be located. In some embodiments, this file path may include an identifier for a device (e.g., IP address) or may be pointed at a particular device with no IP address in the file path. For example, the file definition may include "$install_directory+"/conf/ *.xml" for one or more CI types (e.g., Apache Tomcat service). As noted, the file definition may include wildcards (e.g., *) that enable returning multiple files that satisfy the remaining search criteria in the definition. Furthermore, as noted, the file definition may include resolvable units. For example, the resolvable units may include variables (e.g., "$install_directory" for the install directory) that may be resolved differently for different applications and/or different servers. The resolvable units may also include functions (e.g., "+" for concatenate) to indicate how resolvable units and other portions of the pattern interact. These resolvable units may be resolved in some embodiments by storing the file path expression in a similar format (e.g., Neebula Discovery Language) used for discovery to enable resolution during discovery. Additionally or alternatively, the tracked file definition 352 may include a path to a CI 110, and the configuration files may be discovered during discovery.

Some definitions may identify more configuration files. For example, a pattern to be input as a definition may include an identification section that may be used to identify other configuration files. The platform 104 or the client 102 determines whether the pattern includes additional configuration files (block 354). If additional files are to be included, the platform 104 brings in the additional configuration files to be included (block 356). The platform 104 then performs discovery on a location (e.g., IP address, network, etc.) using the pattern including a file path to discover configuration files satisfying criteria in the pattern (block 358). As part on the discovery, an outgoing payload 360 including the list of tracked file names/locations to be discovered is passed from platform 104 to the MID server 126 via the communication queue 128. In some embodiments, as a preparation, the platform 104 resolves variables in the tracked file definition. Additionally or alternatively, the MID server 126 may resolve the variables. For example, regardless of where the variables are resolved, if an install directory is located at "/tomcat/" in the example discussed above. The file path expression is changed to "/tomcat/*.xml". As discussed below in reference to FIG. 5, the MID server 126 acts upon the payload to discover the configuration files.

The discovered configuration files are then used to populate/add to a list of discovered file names. For example, if a "server.xml" is discovered within the "/tomcat/" install folder, an entry for a tracked file name "/tomcat/server.xml" is created. A single pattern may result in a single entry or may result in multiple entries. For example, if the install directory included multiple XML files, each XML file may be discovered. An input payload 362 including the discovered file names is passed to the platform 104 from the MID server 126 via the communication queue 128.

These discovered file names are then passed to an identification engine 364 that marks the files as tracked in the CMDB 108. For example, an additional identifier (e.g., metadata) about the CI 110 and/or its configuration files may be added as a new CI or added to a current CI. In other words, the configuration file may be stored as its own CI. In some situations, a current CI may be updated to change an indicator (e.g., metadata flag) to indicate that the file is to be tracked when the configuration file already has a CI generated in the CMDB 108.

Since tracking files consumes resources (e.g., memory and processing), the platform 104 may determine whether a configuration file should be removed. (block 366). If the configuration file was not discovered (e.g., has been deleted) at the file path in the definition, the CI created from the configuration file is deleted (block 368).

The CIs 110 (including newly created configuration file CIs) and relations in their entries 370 along with tracked flags are sent to the CMDB 108. The entries in the CMDB 108 may include contents and/or a hashing of the content. For example, the entries may include additional fields, such as those listed in Table 2, to enable file tracking.

TABLE 2

| Tracking configuration files fields in a CI entry | | | |
|---|---|---|---|
| Field name | Label | Type | Description |
| content | File Content | Compressed Data | Contents of the configuration file identified |
| hash | Hash | String | Checksum used by the MID server 126 to determine whether a change has occurred |
| last_modified | Last Modified | Glide Date Time | Most recent modification date and time on the server |
| file_size | File Size | Long | File size in Bytes |

The contents in the configuration file CIs are added to the CMDB 108 to enable tracking. In some embodiments, the contents of the configuration files are compressed before storage as CIs in the CMDB 108. Regardless, as discussed below, the contents in the CMDB 108 may be accessed via a service mapping timeline 372, a CI timeline 374, and/or file comparison user interface (UI) 376.

In some embodiments, an application programming interface (API), such as a Representational State Transfer (REST), may be used to fetch all tracked file definitions. The API may be used during synchronization of tracked file definitions with the MID server 126. Access to these files may be divided into administrators, middle authorities, and users groups, such that one or more groups (e.g., users group) does not have access to the tracked file definitions via the API.

Figure 5:
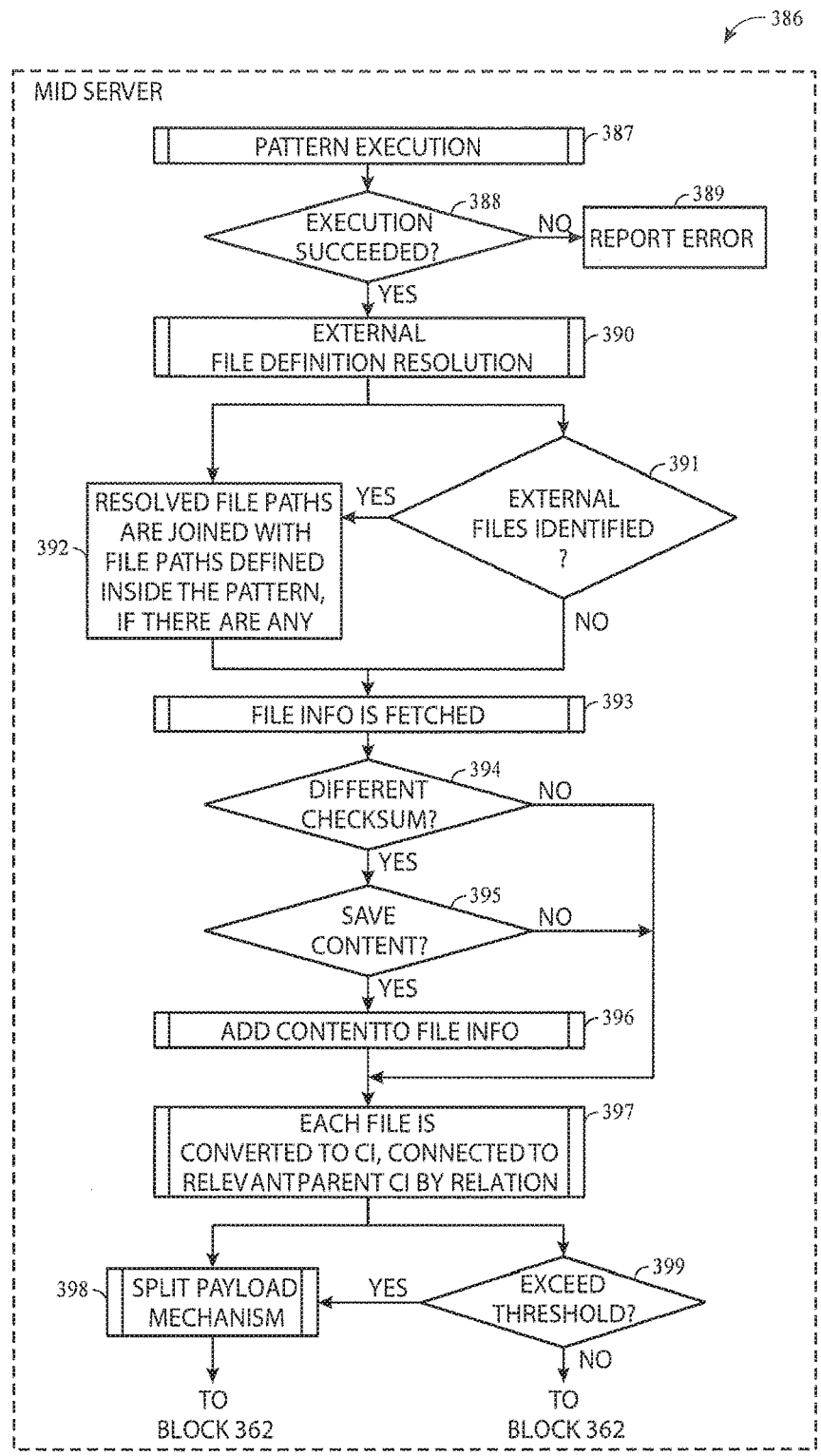
FIG. 5 is a block diagram illustrating a process within the discovery server of FIG. 4 for tracking configuration files, in accordance with an embodiment.

FIG. 5 illustrates a process 386 that may be performed within the MID server 126. The MID server 126 receives the pattern 387 in the payload 360. In some embodiments, the MID server 126 may be synchronized with file definitions/patterns at startup of the MID server 126. A business rule may be used to determine when each insertion or modification of a definition record is synchronized during uptime of the MID server 126.

The MID server 126 discovers whether one or more configuration files satisfy the criteria of the pattern (block 388). If no configuration files satisfy the criteria or the discovery fails for some other reason (e.g., credentials used unable to access the configuration file), the MID server 126 reports the failed discovery (block 389). This reported error may later cause deletion of the CI corresponding to the configuration file from the CMDB 108, as previously discussed.

If one or more configuration files are found, the MID server 126 may begin to resolve external files (block 390). In some embodiments, the resolution of external files may occur when the external files are called by the platform 104. If external files are identified in the pattern (block 391), the MID server 126 resolves the file paths and joins the external file paths with the file paths defined inside the pattern (block 392).

Whether external file paths are resolved or no external file paths are identified, the MID server 126 fetches the file information including information about file content (e.g., actual content, hashed checksum of content, etc.) (block 393). When a hashed checksum is used, the checksum content may be calculated from file content size plus a value of maximum file size and a save_content flag indicating whether the information should be saved. Alternatively, the hashed checksum may be calculated from the file size plus the last modification time and a value of the maximum file size and the save_content flag. Alternatively, the checksum may be any hashed value of the content suitable to indicate whether the content of the configuration file has changed. The MID server 126 compares this file information to previous file information to determine whether the content of the file has changed (block 394). For example, the illustrated embodiment includes a checksum compared to a previous checksum. If the checksum has changed, the MID server 126 also determines whether the content is to be saved to the configuration file info (and later the corresponding CI) (block 395). If the checksum has changed and the content is to be saved, the MID server 126 adds the content to the file information (block 396). The MID server then converts each file to a CI by including appropriate metadata information including connections to relevant parent CIs (block 397).

In some embodiments, the MID server 126 may determine whether the converted CIs with content surpass a payload size threshold (block 399). When the payload exceeds the payload size threshold, the MID server 126 splits the payload into multiple payloads (block 398). These multiple payloads are passed to the communication queue 128 and the identification engine 364 sequentially.

FIGS. 6-10 include screens of an embodiment of user interfaces (UI) that may be used with the systems and methods disclosed herein.

Pattern Designer UI

Figure 6:
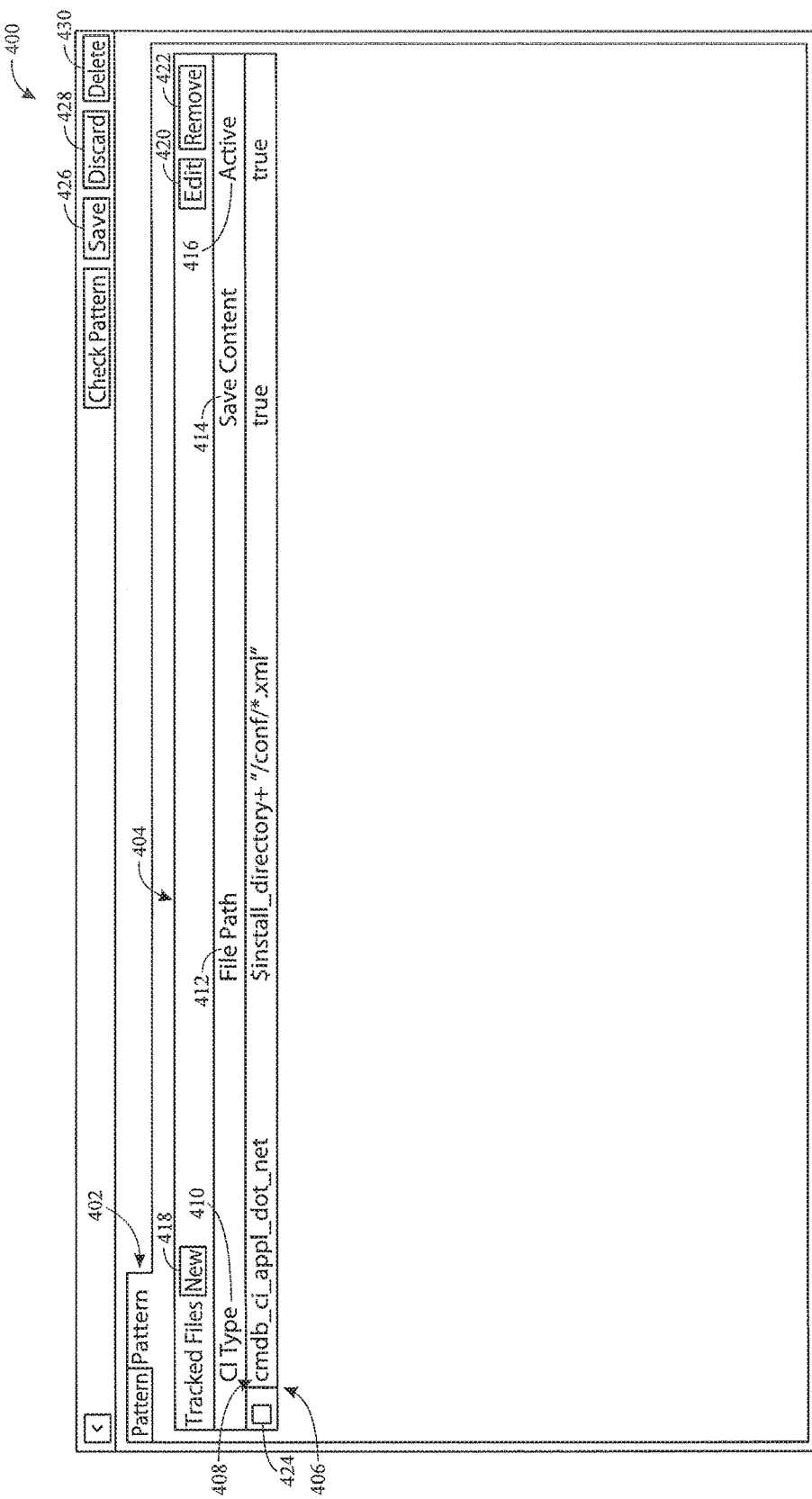
FIG. 6 shows a screen that may be used to access currently tracked file entries and/or create new configuration file tracking entries in a pattern designer for designing patterns for future discovery processes, in accordance with an embodiment.

FIG. 6 shows a screen 400 that may be used to access currently tracked file entries and/or create new configuration file tracking entries in a pattern designer for designing patterns for future discovery processes. As illustrated, the screen 400 includes navigation tabs 402. The navigation tabs 402 enable selection of a pattern viewing screen or a tracked files screen. In the illustrated embodiment, an embodiment of a tracked file screen 404 is presented. Within the tracked file screen 404, a list 406 of tracked files is presented. The illustrated embodiment of the list 406 includes only a single entry 408 while some embodiments may include any number of entries. For each entry in the list 406, a CI Type column 410 that indicates a type of CI corresponding to criteria for the tracked configuration file, a file path column 412 that indicates the file path to the tracked configuration file corresponding to the entry, a save content column 414 that indicates whether content of the configuration file is saved in the CI, and an active column 416 that indicates whether the tracked configuration file is actively being tracked.

The tracked file screen 404 also includes a create entry button 418. Upon selection of the create entry button 418, the screen 400 presents a create file tracking entry creation box, discussed below. Existing entries may be edited or removed using an edit entry button 420 or a remove entry button 422, respectively. In some embodiments, the edit entry button 420 may bring up a file tracking entry edit box that is similar to the create file tracking entry creation box. Additionally, removal of multiple entries may be made simultaneously by selecting a selection box 424 for each respective entry to be removed and clicking the remove entry button 422.

Changes made to the pattern including the tracked configuration file criteria may be saved or discarded using a pattern save button 426 or a pattern change discard button 428. Additionally or alternatively, the pattern may be deleted entirely using a delete button 430.

Comparison Screen UI

Figure 7:
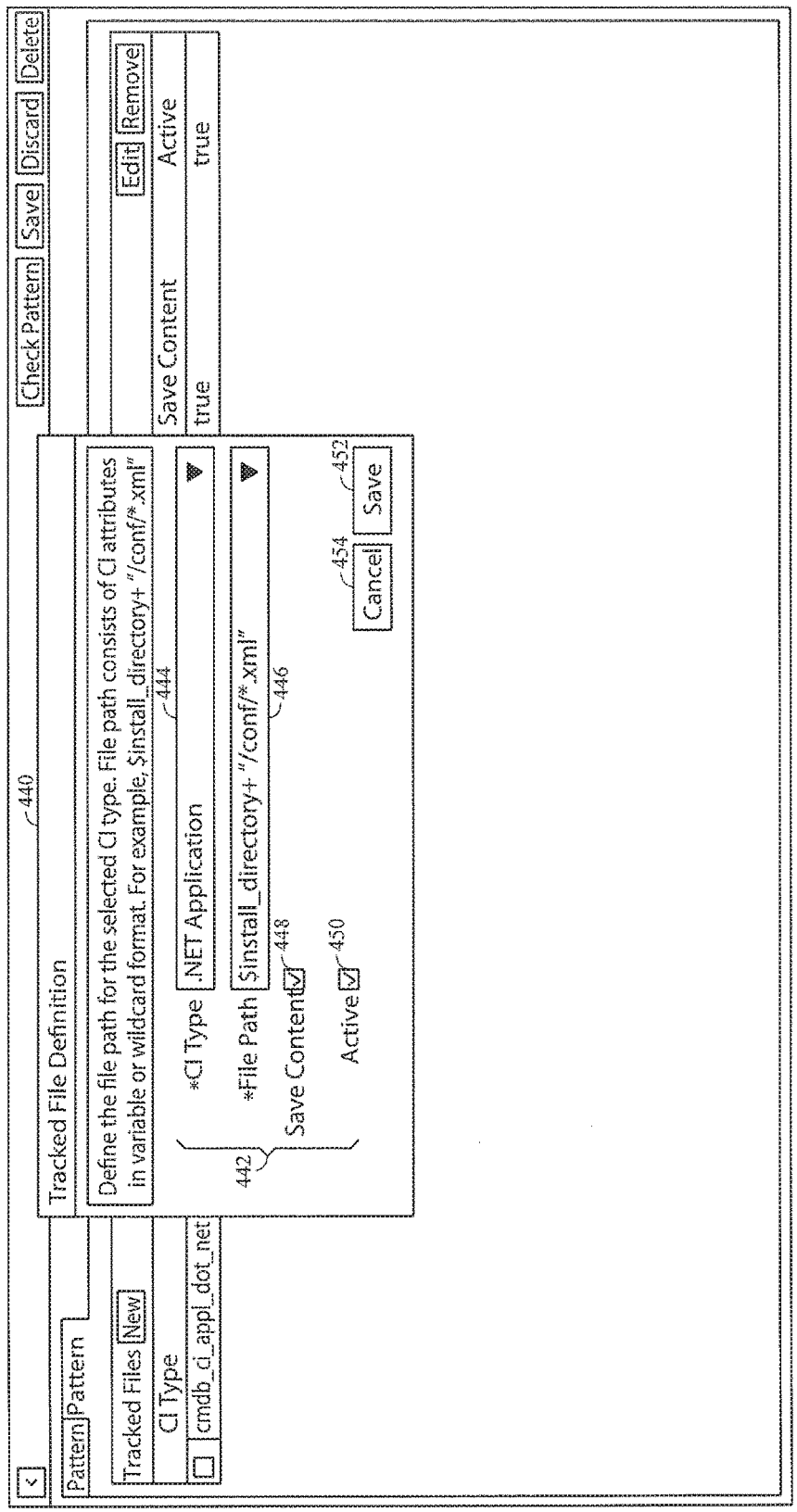
FIG. 7 illustrates a tracked file definition box overlaid on the screen of FIG. 6, in accordance with an embodiment.

FIG. 7 illustrates a tracked file definition box 440 overlaid on the screen 400. The tracked file definition box 440 may be accessed using the new create entry button 418 and/or the edit entry button 420. When the tracked file definition box 440 is opened for an existing entry via the edit entry button 420, fields 442 of the tracked file definition box 440 are filled when opened. The tracked file definition box 440 includes fields 442. Each field 442 may correspond to a column in the tracked file screen 404. In the illustrated embodiment, the fields 442 includes a CI type field 444, a file path field 446, a save content radio 448, and an active tracking radio 450. Changes via the tracked file definition box 440 may be saved to the tracked file screen 404 via a save button 452 or may be canceled without saving to the tracked file screen 404 by clicking a cancel entry button 454.

Once a configuration file is tracked with content saved, a current configuration file may be compared to a previous configuration file. FIG. 8 illustrates an embodiment of a comparison screen 460 comparing a first version 462 of a configuration file to a second version 464 of the configuration file. The specific configuration file may be identified using a configuration file identifier 466. In the illustrated embodiment, the configuration file identifier 466 includes the file path to the configuration file. Additionally or alternatively, the configuration file identifier 466 may include other identification, such as a human-readable label. In some embodiments, the comparison screen 460 may include highlights 468 and 470 where the first version 462 and the second version 464 of the configuration files differ. Moreover, the first version 462 and the second version 464 are saved at different times as indicated by a first save time indicator 472 and a second save time indicator 474. These highlights may be jumped between using a next difference button 476 and a previous difference button 478 by moving to a next difference or a previous difference, respectively.

Service Mapping UI

Figure 9:
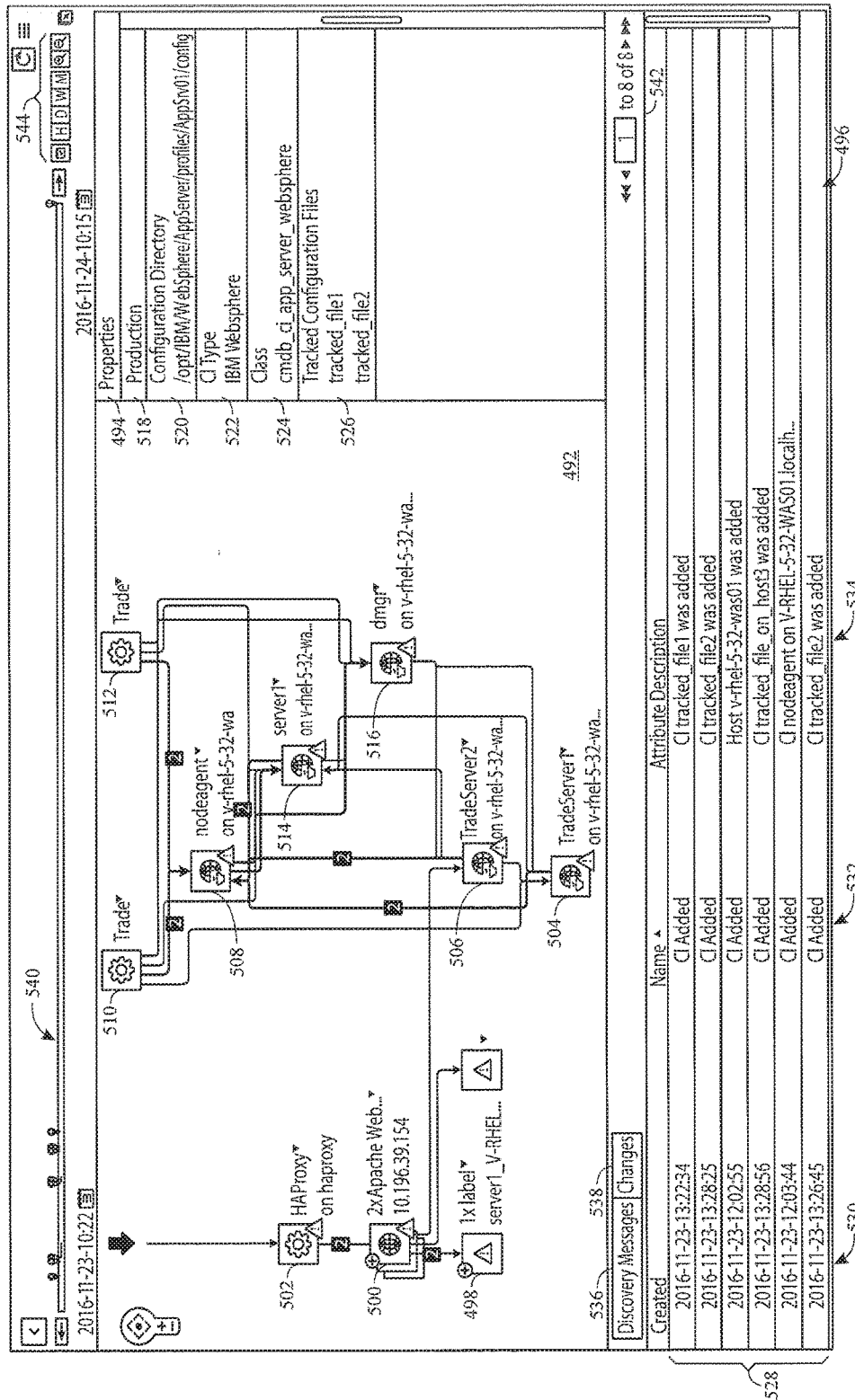
FIG. 9 illustrates a service mapping timeline used to track configuration files, in accordance with an embodiment.

Service mapping timelines 372 may be used to display an accurate, up-to-date view of infrastructure of one or more networks (e.g., IT networks). The service mapping timelines 372 may be used to view CIs that have been discovered during discovery processes. FIG. 9 illustrates a service mapping timeline 490. The service mapping timeline 490 includes a service map 492, a properties frame 494, and a changes timeline frame 496. The service map 492 includes icons 498, 500, 502, 504, 506, 508, 510, 512, 514, and 516 that each corresponds to a CI 110 that has been discovered during a discovery process. The service map 492 includes graphical illustration of interconnections between the CIs.

Upon selection of an icon from the service map, the properties frame 494 may reflect information about the selected CI and its related configuration files. For example, the properties frame 494 may include a configuration directory sub-frame 518, a CI type sub-frame 520, a class sub-frame 522, a tracked configuration files sub-frame 524, and a detailed properties sub-frame 526. The configuration directory sub-frame 518 indicates a directory under which configuration files for the CI may be located. The CI type sub-frame 520 indicates a CI type for the currently selected CI. The class sub-frame 522 indicates a class for the currently selected CI. The tracked configuration files sub-frame 524 includes a list of configuration files being tracked for the CI. The detailed properties sub-frame 526 may include additional details about the CI that does not fit in the categories designated for the other sub-frames.

The changes timeline frame 496 may display a list 528 of changes to tracking and/or tracked files. In some embodiments, the list 528 may include changes to any and all CIs in the service map. Alternatively, the list 528 may display changes only related to a selected CI. The list 528 details information about the changes. For example, the list 528 includes when the change occurred in a created column 530, a name for the change in a name column 532, and an attribute description of the change in an attribute description column 534.

The changes timeline frame 496 may display other information. For example, to display discovery messages (e.g., errors in discovery), a discovery message button 536 may be selected. From a display of discovery messages, the list 528 of changes may be displayed after selection of a changes button 538. In the illustrated embodiment, CIs are only added. The CIs may be visually marked as added using a visual notification, such as the exclamation point and triangle illustrated in the embodiment.

The service mapping timeline 490 may also include timeline 540 reflecting all of the changes. Clicking a location in the timeline 540 may change which changes are reflected in the list 528. Alternatively, the list 528 may be navigated using a navigation control 542. A resolution of the timeline 540 may be changed using resolution controls 544. In some embodiments, increasing the resolution may increase a number of events shown on the timeline.

Figure 10:
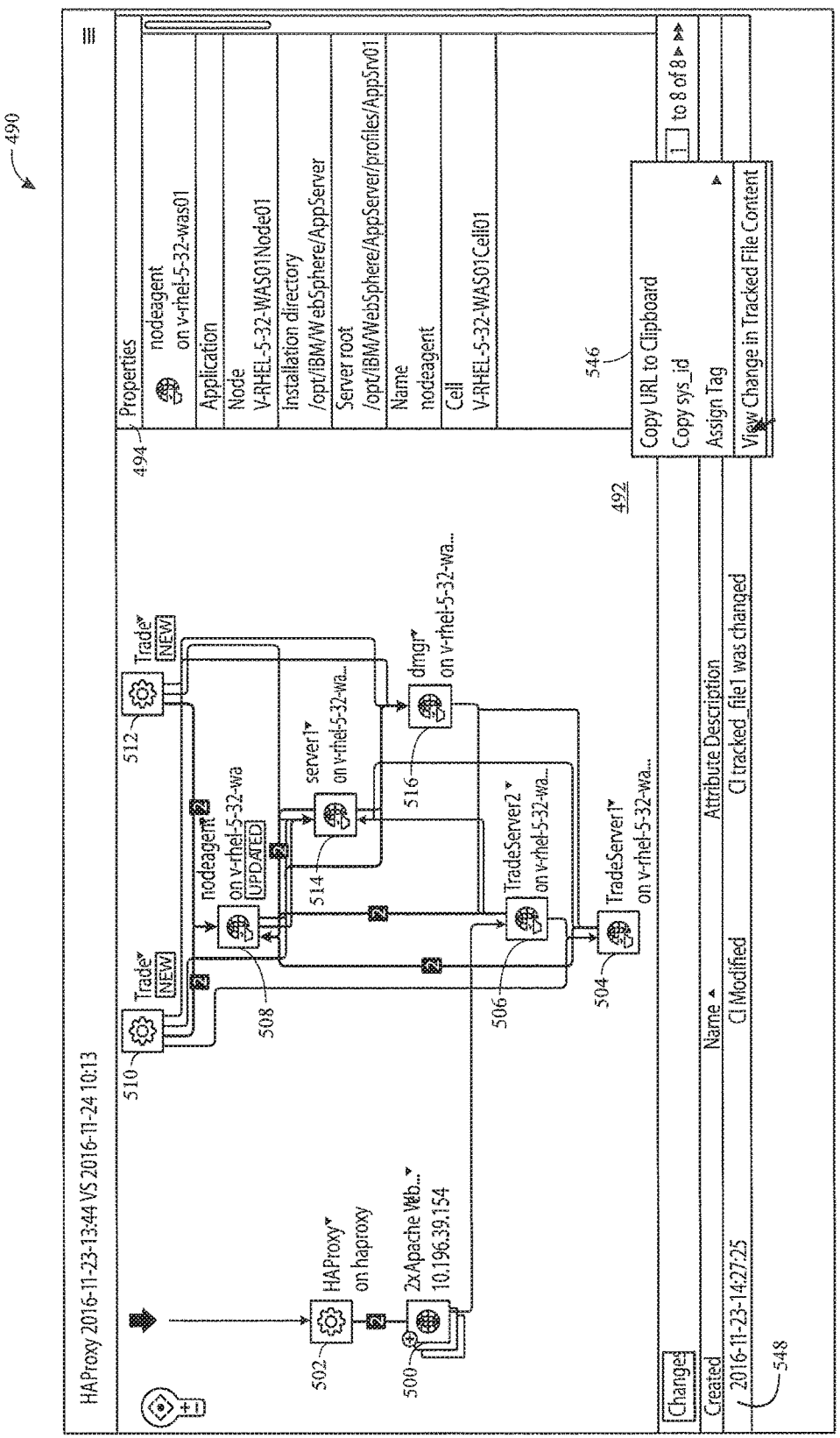
FIG. 10 illustrates the service mapping timeline of FIG. 9 at a later time illustrating a change in a configuration item, in accordance with an embodiment.

FIG. 10 illustrates the service mapping timeline of FIG. 9 at a subsequent time when the only tracked change for the selected icon 508 is an update to the CI tracked item corresponding to icon 508. In some embodiments, this update may be visually marked on the display. For example, in the illustrated embodiment, the word "UPDATED" is added next to the icon 508. However, in some embodiments, other text or icons may be used to indicate that the corresponding file has been updated. Furthermore, since the icon 508 is selected, the properties frame 494 has changed to display the properties of the CI corresponding to the icon 508.

In some embodiments, a sub-menu 546 corresponding to the update may be displayed upon a trigger condition (e.g., right mouse click on an icon (selected icon 508) or row (e.g., row 548) associated with the update). The sub-menu 546 may provide an option 550 to view the change in the tracked file content. Upon selection of the option 550, a comparison screen (e.g., similar to the comparison screen 460 of FIG. 8) may be presented, illustrating the change in the tracked file.

Platform as a service (PaaS) services may also be discovered during the discovery process and provided in a service mapping. PaaS services are cloud computing services that provide a platform for developing, running, and/or managing applications without building the supporting infrastructure. PaaS discovery may be more complex than discovering typical hosts, because the services may be provided as a host-less service to the system. For example, PaaS services may include Amazon Web Services (AWS) elastic load balancing (ELB) and relational database services (RDS) and/or Azure Load Balancer (LB), Websites, and Structured Query Language (SQL), etc. These host-less components (e.g., where the host or hosts are transparent to a service consuming the service) may be discovered by infrastructure patterns and/or application patterns as part of cloud only services and/or hybrid services. To do this, the services may be interrogated to determine a presentation for the PaaS service independent from information pertaining to the host that hosts the PaaS service, as the host information is not available to the system.

As mentioned above the patterns are the engines that hold logic commands to be executed to interrogate hosts to understand the applications and their relationships for the discovery process. Accordingly, to facilitate discovery of host-less components, new pattern operations may be introduced. For example, a Representational state transfer (REST) Application Programming Interface (API) call pattern operation, which may be used to interrogate the host-less components. Further, a parsing strategy may be introduced, such as JavaScript Object Notation (JSON) parsing, which may aid in parsing interrogation outcomes. To store the parsed outcome, a CMDB model that supports a logical data center without hardware may be introduced to the CMDB.

Figure 11:
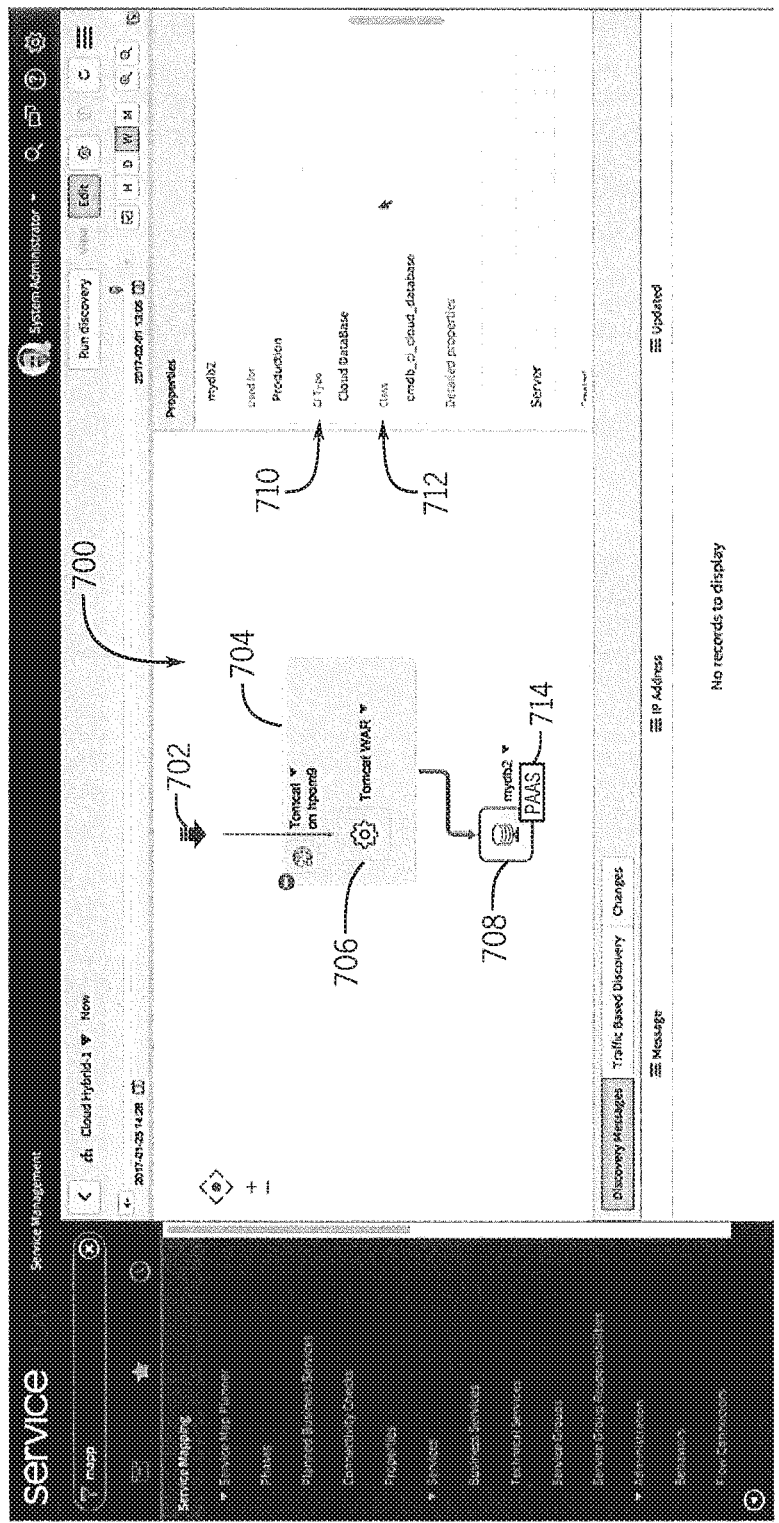
FIG. 11 illustrates a service mapping including a PaaS service, in accordance with an embodiment.

For example, FIG. 11 illustrates a hybrid service mapping 700 including a PaaS service, in accordance with an embodiment. As illustrated, the service mapping 700 includes an entry point 702. The entry point 702 is a property of a connection to a configuration item (CI). Service mapping starts the discovery and mapping process from the entry point 702.

Applicative components of the starting point 702 (e.g. the Tomcat Server 704 in FIG. 11) are displayed in the service mapping 700. Further, applications associated with the applicative components may also be presented in the service mapping 700. For example, an internal web application archive (WAR) file of the Tomcat Server 704 may indicate an application.

The service mapping may also provide PaaS components. The PaaS components may be any number of PaaS components. For example a Cloud Network Address Translator (NAT), a network load balancer, etc. In the current example, the application 706 may interact with a database 708 (or other component), which is displayed in the service mapping 700. In FIG. 11, the database 708 is a host-less component (e.g., a PaaS component), as indicated by the CI type field 710, which indicates that the database is a cloud database. As mentioned above, a special CMDB model may enable storage of host-less CI's, as indicated by the class 712. Further, an indicator icon 714 may also indicate that the component is a PaaS component and/or a particular type of PaaS component.

Figure 12:
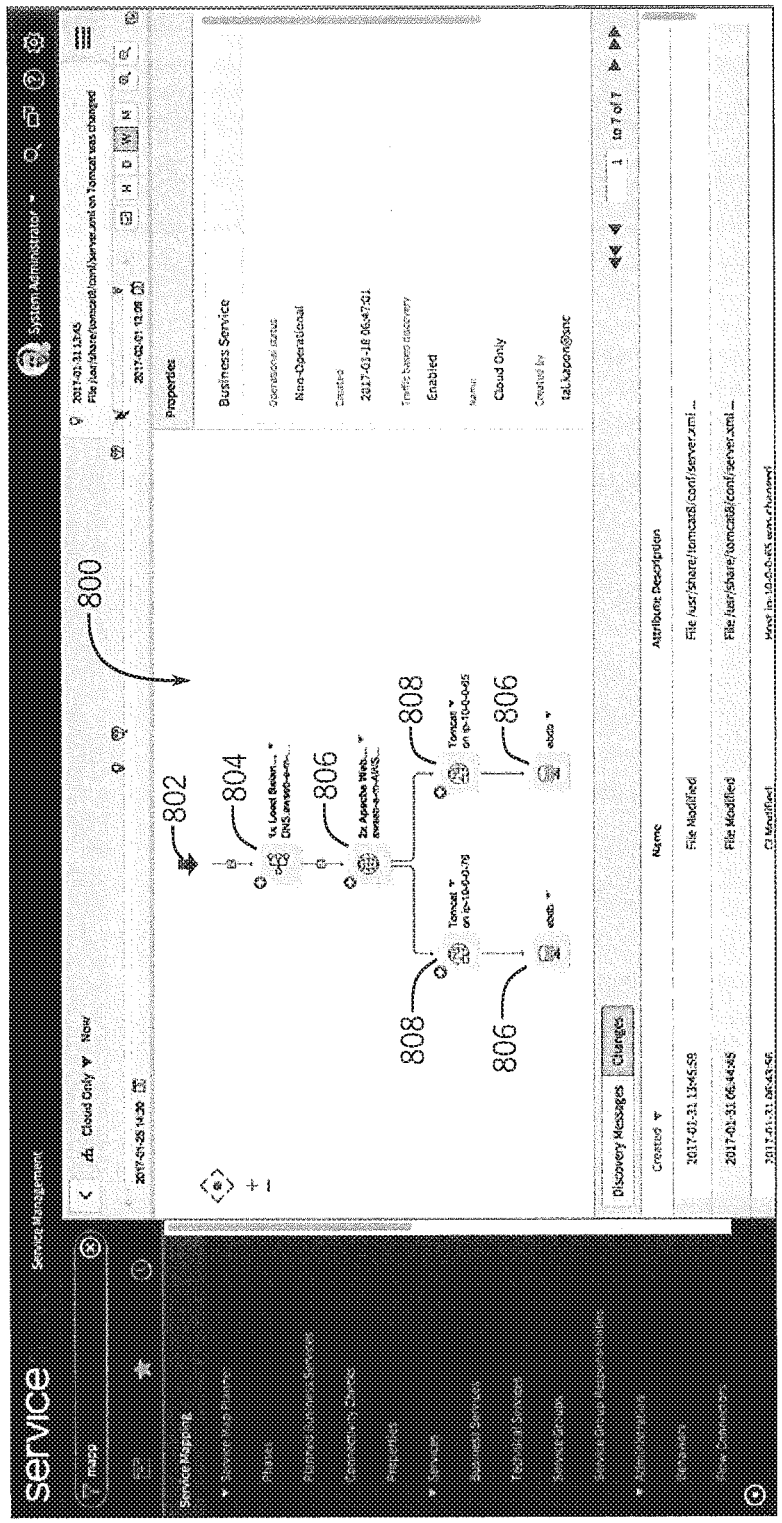
FIG. 12 illustrates a service mapping starting with a PaaS service, followed by additional components, in accordance with an embodiment.

FIG. 12 illustrates a cloud-only service mapping 800 starting with PaaS services, in accordance with an embodiment. In the mapping 800, the entry point 802 corresponds to a PaaS component (e.g., an elastic load balancer service 804). Further, the subsequent components include a mix of PaaS components 806 and hosted components 808.

Traffic-Based Mappings

Figure 13:
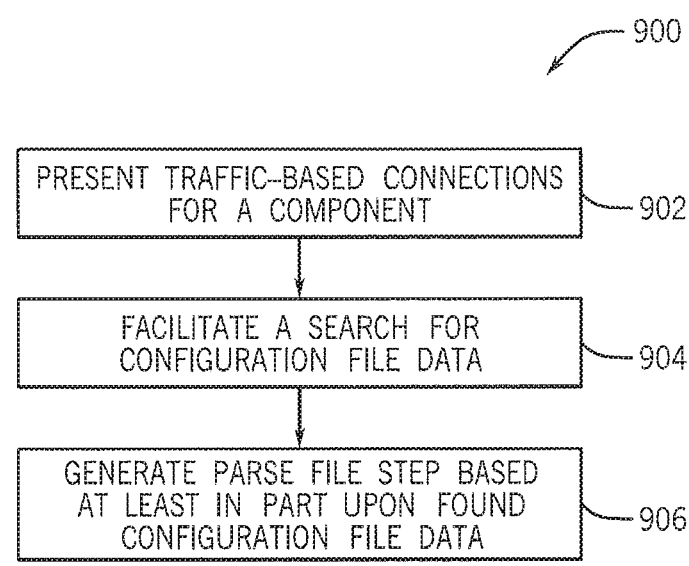
FIG. 13 is a flowchart illustrating a process for generating a parse file step based upon traffic-based connections, in accordance with an embodiment.

As mentioned above, service mappings provide relationships between applicative components. Patterns and associated configuration files may provide a stable indication of these relationships and may be a default mechanism for determining the service mapping. However, in situations, environmental variables may make pattern-based and/or configuration-based mapping difficult, as these variables may render the patterns ineffective and/or make the configuration files difficult to discover. Accordingly, in some embodiments, traffic-based connections may be relied upon as indicating a relationship (e.g., connection) between components. In some embodiments, reliance on the traffic-based connection only occurs when the connection is not defined (e.g., based upon a pattern and/or configuration files). FIG. 13 is a flowchart illustrating a process 900 for generating a parse file step based upon traffic-based connections, in accordance with an embodiment. FIGS. 14-19 illustrate screens that facilitate service mappings based upon traffic-based connections. While a manual process facilitated by graphical user interfaces is provided in these figures, this discussion is not intended to limit the concepts to such a manual process. Indeed, in some embodiments, each of the steps presented in FIGS. 14-19 may be implemented in an automated fashion by the system.

Figure 14:
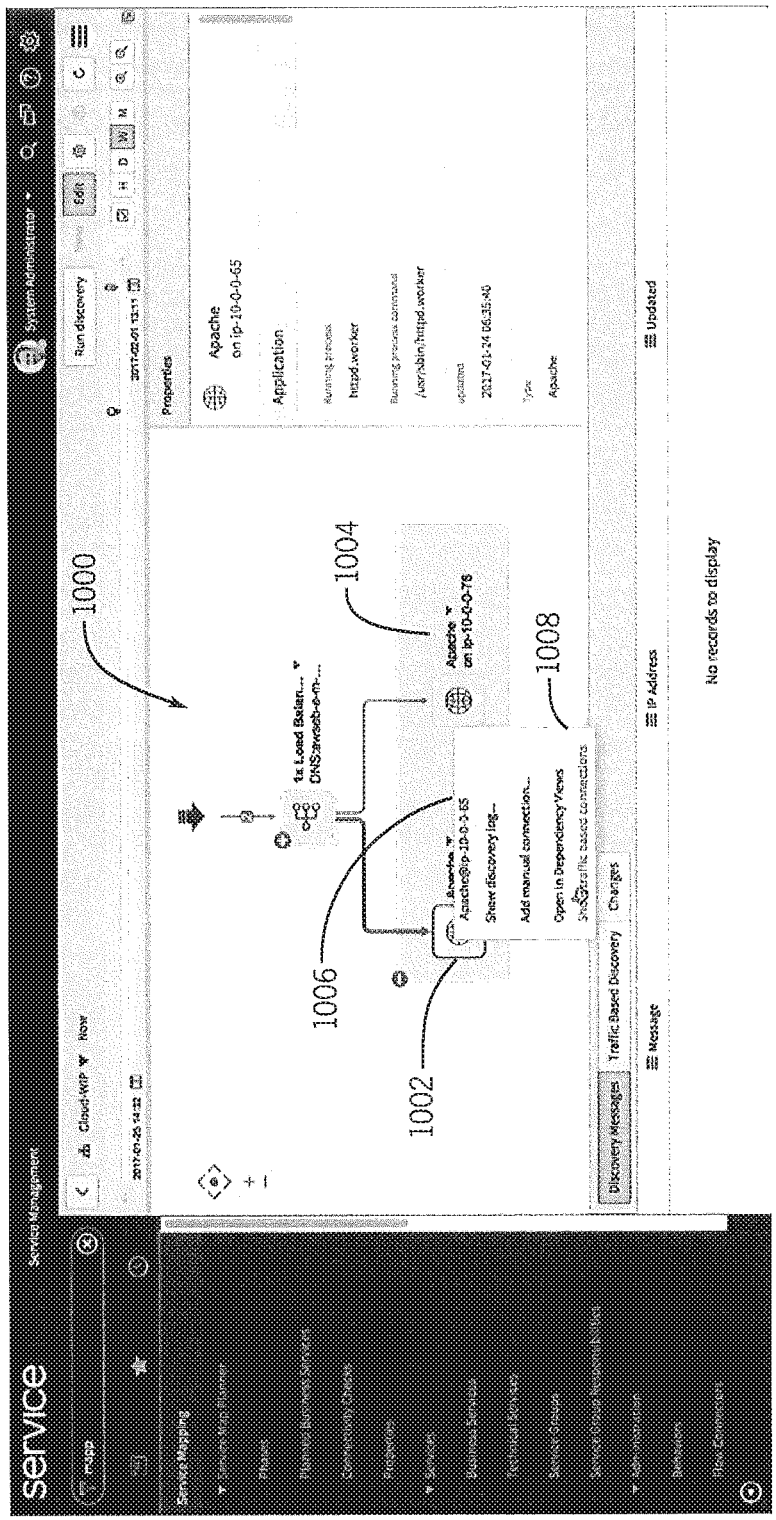
FIG. 14 shows a screen that may be used to trigger a listing of traffic-based connections, in accordance with an embodiment.

The process 900 begins by obtaining traffic-based connections for a component (block 902). FIG. 14 shows a screen 1000 that may be used to trigger a listing of traffic-based connections, in accordance with an embodiment. As illustrated in FIG. 14, the components 1002 and 1004 do not have outputs, indicating that the service mapping is incomplete. As mentioned above, the service mapping may be hindered when configuration files are not discoverable via a known pattern. When configuration files cannot be found, traffic-based connections may be used to facilitate configuration files. In some embodiments, this process may be triggered via a sub-menu 1006 associated with one of the components (e.g., components 1002 and/or 1004). The sub-menu 1006 may include an option 1008 to provide traffic-based connections.

Figure 15:
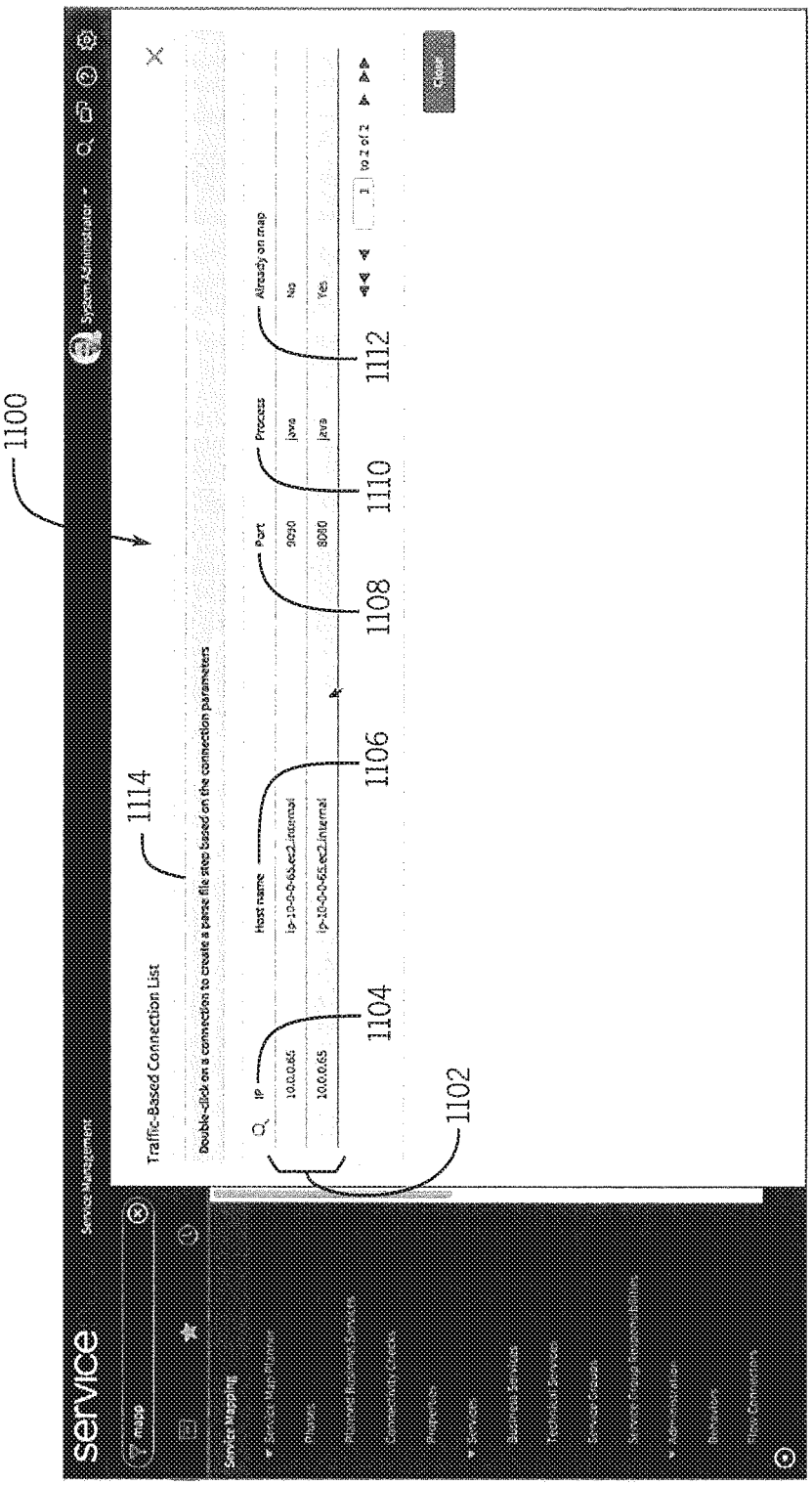
FIG. 15 shows a screen that provides a list of traffic-based connections, in accordance with an embodiment.

Upon selection of the option 1008, the traffic-based connections may be obtained and presented. FIG. 15 shows a screen 1100 that provides a list 1102 of traffic-based connections, in accordance with an embodiment. As illustrated, the list 1102 may include IP address 1104, Host Names 1106, Ports 1108, Processes 1110, and an Indication of whether the connection is already mapped 1112.

Figure 16:
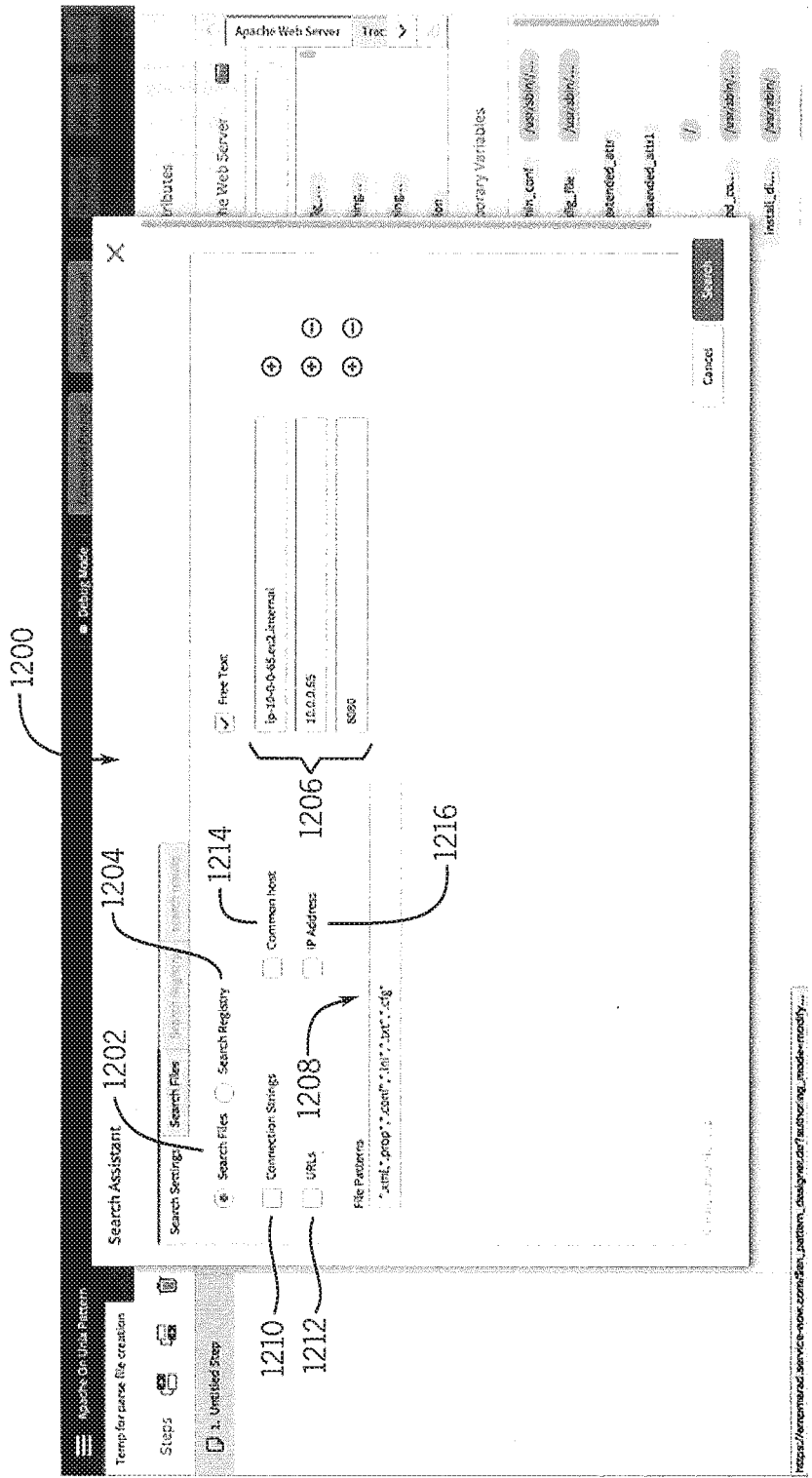
FIG. 16 shows a search settings screen of a search assistant, in accordance with an embodiment.

Returning to FIG. 13, the process 900 continues by facilitating a search for configuration file data associated with the traffic-based connections (block 904). FIG. 16 shows a search settings screen 1200 of a search assistant useful in creating parse file steps, in accordance with an embodiment. The search setting screen 1200 may be accessed by double-clicking a traffic-based connection, as indicated by the notification 1114 of FIG. 15. The search settings screen 1200 includes an option 1202 to search files and/or an option to search a registry 1204. Further, the parameters from selected record of the traffic-based connection list 1102 of FIG. 15 are transferred into the search settings screen 1200 as search parameters 1206, such that the traffic-based connection may be searched. A set of file patterns 1208 may be provided, indicating a set of file types that will be searched for configuration information. In some embodiments, a set of default file patterns may be provided. For example, the default file patterns may be those depicted in FIG. 16. The default file patterns 1208 may be modified to add and/or delete file types. Additionally, the search settings screen 1200 may include options to find connection strings 1210, URLs 1212, a Common Host 1214, and an IP address 1216.

Figure 17:
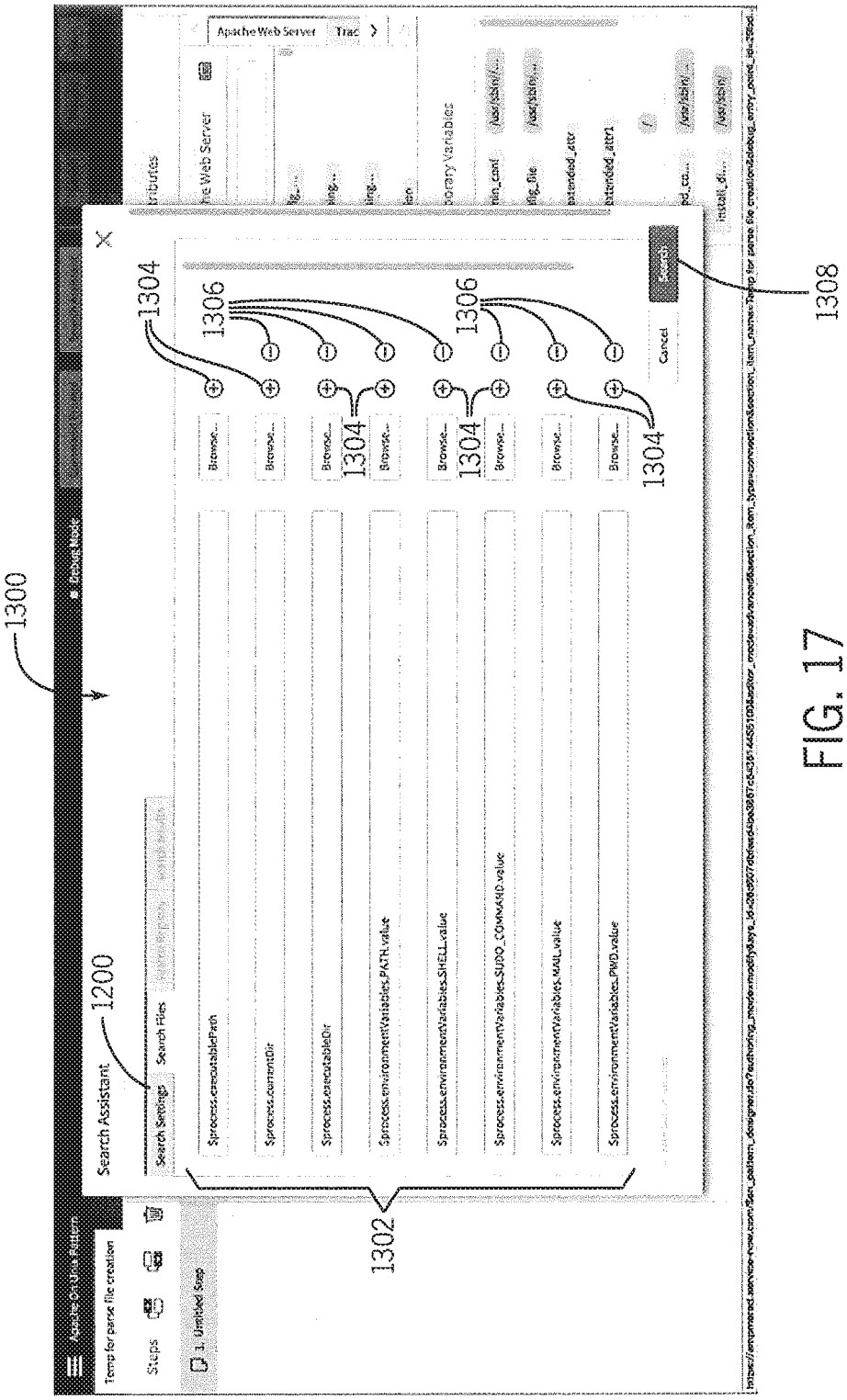
FIG. 17 shows a search files screen of a search assistant, in accordance with an embodiment.

Once the search settings screen 1200 is populated with the proper settings, the search paths may be defined. FIG. 17 shows a search files screen 1300 of a search assistant, where search paths may be defined, in accordance with an embodiment. The search files screen 1300 provides a list 1302 of paths to search. In some embodiments, a default set of common paths may be provided automatically. For example, each of the paths provided in list 1302 are default common paths in the current embodiment. Additional search paths may be added using the addition option 1304. Further, search paths may be removed using the minus icon 1306.

Figure 18:
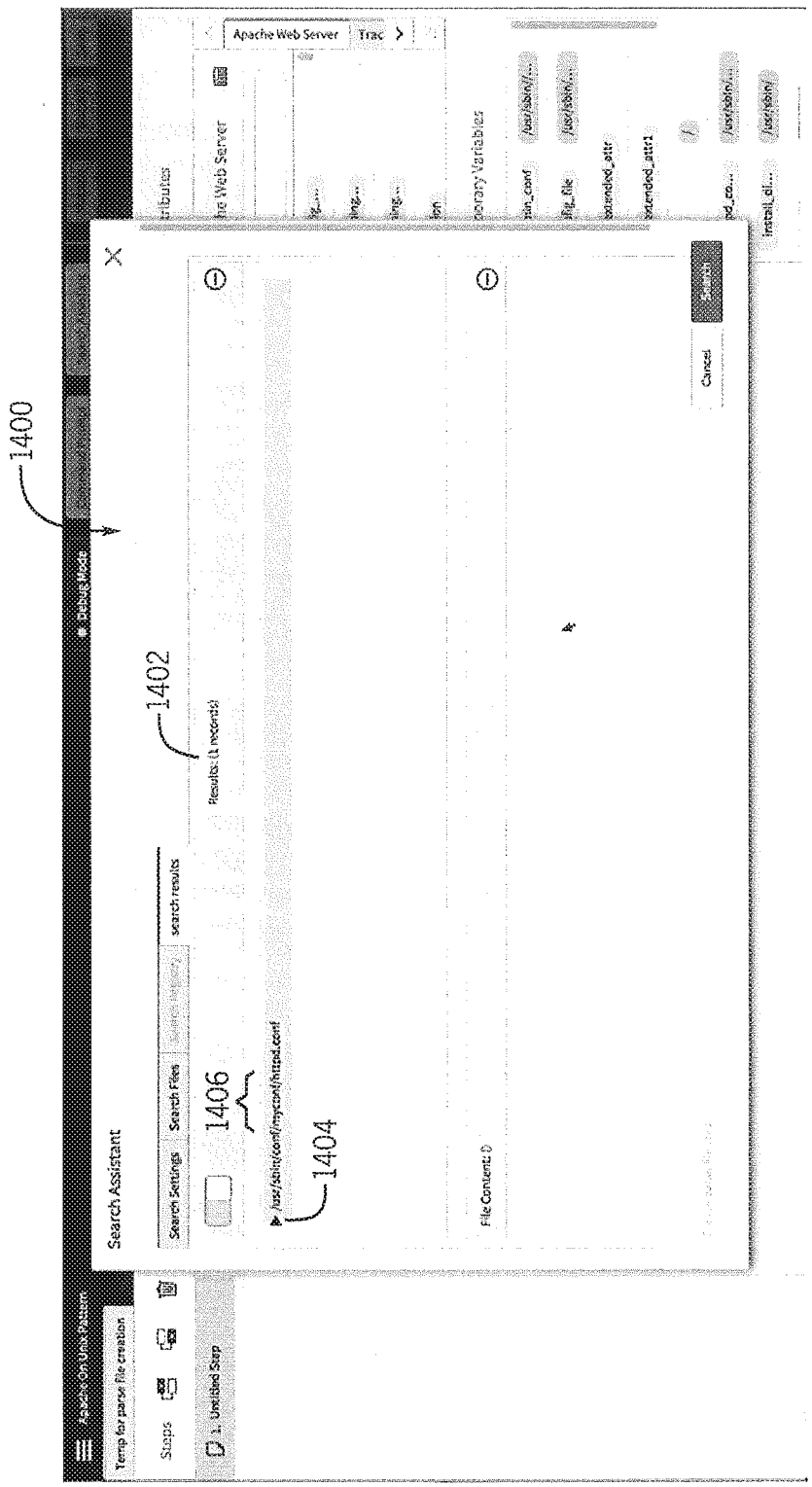
FIG. 18 shows a search results screen of a search assistant, in accordance with an embodiment.

Upon completion of configuration of the search settings screen 1200 and the search files screen 1300, the search may be triggered by selecting the search icon 1308. The search will run recursively through the list 1302 of search paths on the selected component, looking for the text provided in the search parameters 1206 of FIG. 16 in the set of file patterns 1208 of FIG. 16. FIG. 18 shows a search results screen 1400 of a search assistant, in accordance with an embodiment. The search results screen 1400 may provide an indication 1402 of a number of records found in the search. In FIG. 18, 1 record was found. The configuration-containing path record 1404 is displayed on the search results screen 1400. In the current example, the "myconf" path structure 1406 is not a standard path structure, which may be the reason no configuration files were previously found by the discovery process. However, by recursively searching specific file patterns in a set of paths for the traffic-based connection parameters, the configuration files may be found.

Figure 19:
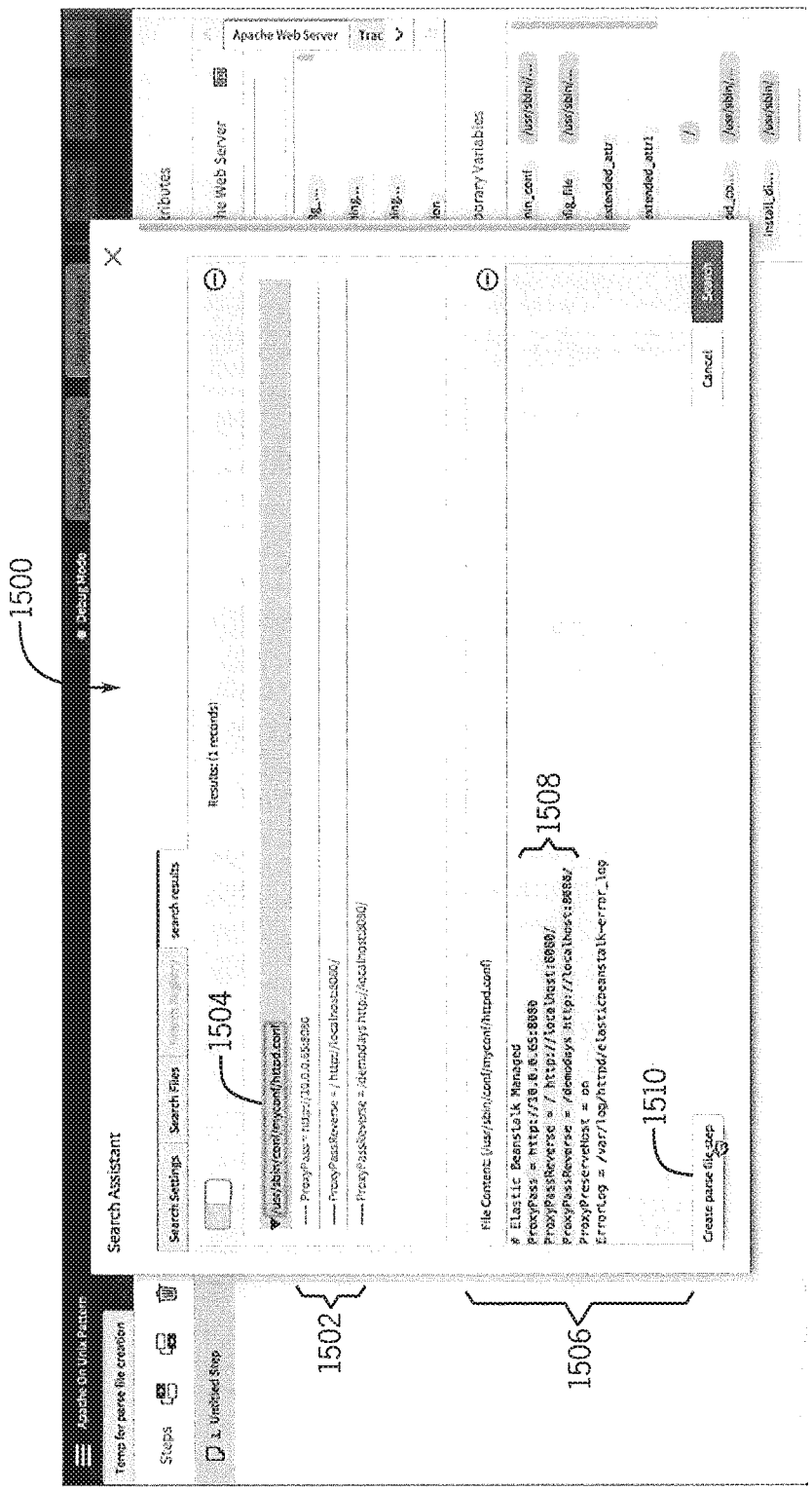
FIG. 19 shows expanded search results of a search assistant, in accordance with an embodiment.

Upon selection of a configuration-containing record 1404, details of the configuration-containing record 1404 may be expanded. FIG. 19 shows a screen 1500 with expanded search results of a search assistant, in accordance with an embodiment. As illustrated, the found parameters 1502 may be displayed. Further, upon selection of the file name 1504 and/or one of the found parameters 1502, the file contents 1506 may be provided. The lines 1508 where the found parameters 1502 were found may be highlighted or otherwise differentiated (e.g., color changed, font changed, etc.).

Figure 20:
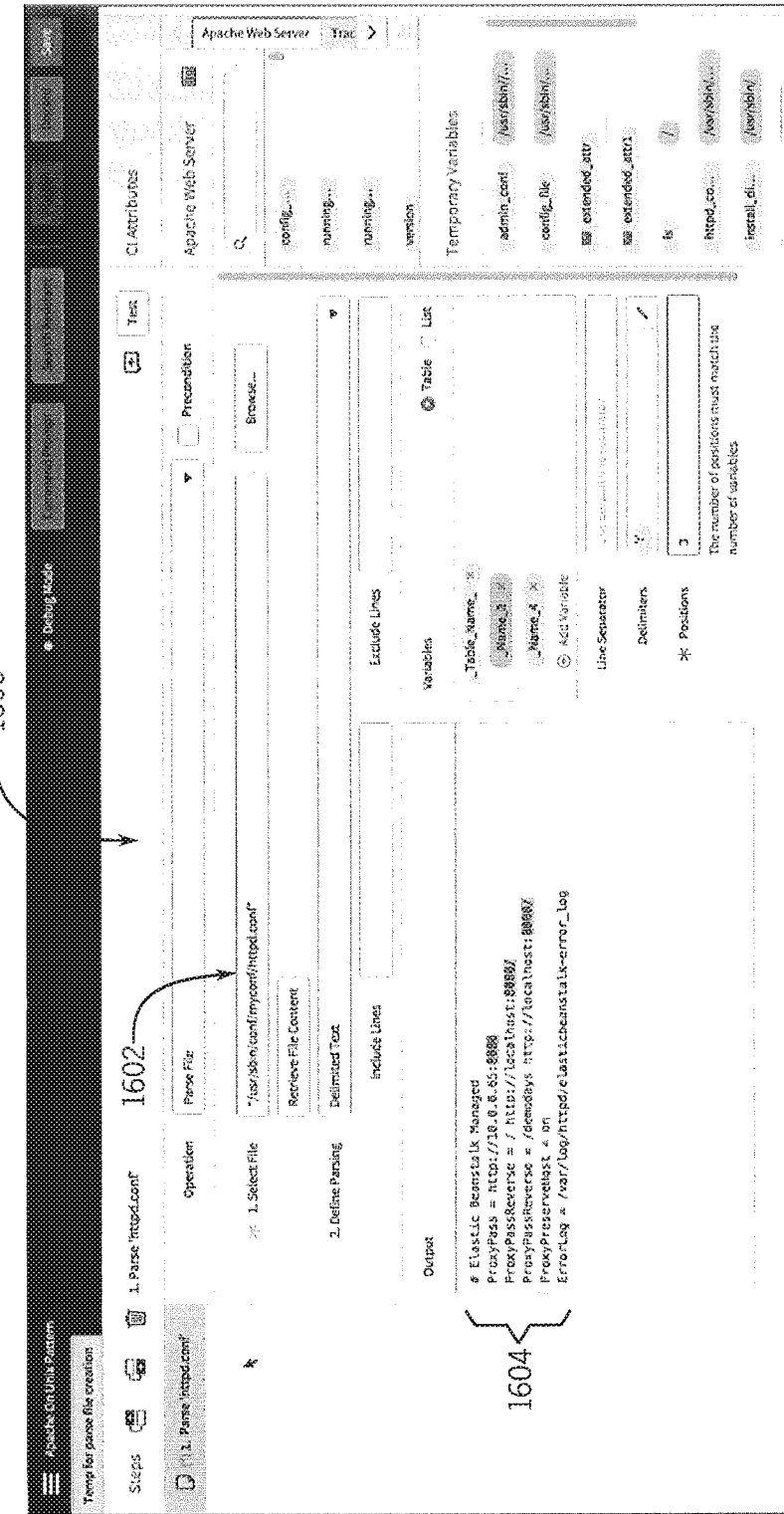
FIG. 20 shows a pattern designer screen, where parse file steps may be generated and added to a new connectivity section and/or an existing connectivity section as part of a pattern, in accordance with an embodiment.

Once the search results are available, a parse file step may be generated based upon the found configuration data (block 906 of FIG. 13). For example, in some embodiments, the parse file step may be generated by selecting option 1510. FIG. 20 illustrates a pattern designer screen 1600, where parse file steps may be generated and added to a new connectivity section and/or an existing connectivity section as part of a pattern. As illustrated, the pattern designer screen 1600 includes the file name 1602 that was found in the previous search. Additionally, the file contents 1604 are provided.

By facilitating generation of parse file steps using traffic-based connections, connection portions of patterns may be formed, where previously unavailable without the knowledge of an expert in the field that knows the particular configuration path modifications made on particular systems. Thus, the processes described herein may expedite the discovery process, while reducing human intervention.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, machine-readable medium, comprising machine-readable instructions, configured to:
provide a set of traffic-based connections for one of a set of applicative components provided in a service mapping;

facilitate a search for configuration data, by recursively searching a set of specified paths for data matching one or more parameters of one of the set of traffic-based connections; and generate a parse file operation using at least a portion of results of the search.

2. The machine-readable medium of claim 1, comprising machine-readable instructions, configured to:

present, via a graphical user interface (GUI), the service mapping, wherein the service mapping comprises the set of applicative components and relationships between the set of applicative components;

receive, via the GUI, a first request to present a traffic-based connection for the one of the set of applicative components; and upon receiving the first request, provide the set of traffic-based connections by presenting, via the GUI, the set of traffic-based connections.

3. The machine-readable medium of claim 2, comprising machine-readable instructions, configured to:

present, via the GUI, an option to trigger the first request in a sub-menu for a subset of the set of applicative components where configuration files have not been discovered.

4. The machine-readable medium of claim 1, comprising machine-readable instructions, configured to:

receive, via a graphical user interface (GUI), a parse file operation generation request for the one of the set of traffic-based connections; and upon receiving the parse file operation generation request, present, via the GUI, a search assistant GUI configured to facilitate the search for the configuration data.

5. The machine-readable medium of claim 4, wherein the search assistant GUI comprises a set of automatically populated search parameters matching the one or more parameters of one of the set of traffic-based connections.

6. The machine-readable medium of claim 4, wherein the search assistant GUI comprises an input for providing a set of file patterns, wherein the set of file patterns are initially automatically populated to a set of default file patterns that are modifiable.

7. The machine-readable medium of claim 4, wherein the search assistant GUI comprises an input for providing the set of specified paths, wherein the set of specified paths are initially automatically populated to a set of default search paths that are modifiable.

8. The machine-readable medium of claim 4, comprising machine-readable instructions, configured to:

receive a search request, via the search assistant GUI;
upon receiving the search request:
perform the searching of the set of specified paths; and
present the results of the search via the search assistant GUI.

9. The machine-readable medium of claim 4, comprising machine-readable instructions, configured to:

receive a request to use the results of the search to generate the parse file operation; and upon receiving the request to use the results of the search to generate the parse file operation, generate the parse file operation using the at least a portion of the results of the search.

10. The machine-readable medium of claim 1, comprising machine-readable instructions, configured to:

provide the set of traffic-based connections for the one of a set of applicative components provided in the service mapping and facilitate the search for the configuration data automatically independent from receiving a request from a graphical user interface (GUI) to perform these actions.

11. The machine-readable medium of claim 1, wherein the set of applicative components provided in a service mapping comprises at least one Platform as a service (PaaS) component.

12. The machine-readable medium of claim 11, wherein the at least one Platform as a service (PaaS) component comprises a load balancer, a web service, or both.

13. The machine-readable medium of claim 1, wherein the set of applicative components provided in a service mapping comprises at least one network address translation (NAT) component configured to map one Internet Protocol (IP) address space into another IP address space.

14. A method, comprising:

providing a set of traffic-based connections for one of a set of applicative components provided in a service mapping;

facilitating a search for configuration data, by recursively searching a set of specified paths for data matching one or more parameters of one of the set of traffic-based connections; and generating a parse file operation using at least a portion of results of the search.

15. The method of claim 14, comprising:

providing a PaaS indication in the service mapping for each of the set of applicative components in the service mapping that are Platform as a service (PaaS) components, wherein at least one of the set of applicative components is a PaaS component.

16. An automated pattern operations system, comprising:

a non-transitory memory; and one or more hardware processors configured to read instructions from the non-transitory memory to perform operations comprising:

determining a hybrid map comprising at least one on-premises component and at least one cloud component, wherein one or more properties from the hybrid map indicates that the on-premises component is associated with an on-premises environment and the cloud component is associated with a cloud environment;

detecting one or more missing connections associated with at least one of the on-premises component and the cloud component;

identifying a plurality of traffic-based connections associated with at least one of the on-premises component and the cloud component based at least on the one or more missing connections, wherein the plurality of traffic-based connections is associated with a parameter;

performing a recursive search with a plurality of file paths associated with configuration files based at least on the parameter from the at least one of the plurality of traffic-based connections;

identifying one or more files from the recursive search that corresponds to the parameter; and automating one or more pattern operations in at least one of the on-premises environment and the cloud environment based at least on the one or more identified files.

17. The automated pattern operations system of claim 16, wherein the hybrid map comprises a first component that is a Platform as a service (PaaS) component and subsequent components that are non-PaaS components.

18. The automated pattern operations system of claim 16, wherein the operations comprise:

identifying a modified configuration file; and
automating the one or more pattern operations based upon the modified configuration file.

19. The automated pattern operations system of claim 16, wherein the operations comprise:
identifying a modified configuration file; and
presenting an indication that the modified configuration file has been modified via the hybrid map.

20. The automated pattern operations system of claim 16, wherein the hybrid map provides a service-aware view of a system infrastructure of the automated pattern operations system, enabling root-cause analysis of performance of the automated pattern operations system.

\* \* \* \* \*